United States Patent
Yoshizawa et al.

(10) Patent No.: US 8,399,152 B2
(45) Date of Patent: Mar. 19, 2013

(54) METHOD OF PRODUCING FUEL CELL CATALYST LAYER

(75) Inventors: Atsuhito Yoshizawa, Kawasaki (JP);
Shinnosuke Koji, Kawasaki (JP);
Kazuhiro Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 613 days.

(21) Appl. No.: 12/598,823

(22) PCT Filed: Jun. 10, 2008

(86) PCT No.: PCT/JP2008/060930
§ 371 (c)(1),
(2), (4) Date: Nov. 4, 2009

(87) PCT Pub. No.: WO2008/153168
PCT Pub. Date: Dec. 18, 2008

(65) Prior Publication Data
US 2010/0107404 A1    May 6, 2010

(30) Foreign Application Priority Data

Jun. 12, 2007  (JP) ................................ 2007-155473
Mar. 18, 2008  (JP) ................................ 2008-070442

(51) Int. Cl.
H01M 4/02   (2006.01)
H01M 4/36   (2006.01)
H01M 4/92   (2006.01)
H01M 4/38   (2006.01)
H01M 8/10   (2006.01)

(52) U.S. Cl. .......................... 429/523; 429/524; 429/485
(58) Field of Classification Search .......................... None
See application file for complete search history.

(56) References Cited

U.S. PATENT DOCUMENTS

| 5,518,831 | A | 5/1996 | Tou et al. |
| 7,208,437 | B2 * | 4/2007 | Renock et al. ................ 502/117 |
| 2002/0091225 | A1 * | 7/2002 | McGrath et al. .............. 528/170 |
| 2004/0265676 | A1 | 12/2004 | Takagi et al. |

(Continued)

FOREIGN PATENT DOCUMENTS

| EP | 1879249 A1 | 1/2008 |
| JP | 1999-510643 A | 9/1999 |

(Continued)

OTHER PUBLICATIONS

Extended European Search Report in European Application No. 08765623.7 (Feb. 29, 2012).

(Continued)

*Primary Examiner* — Emily Le
*Assistant Examiner* — Michael Forrest
(74) *Attorney, Agent, or Firm* — Fitzpatrick, Cella, Harper & Scinto

(57) ABSTRACT

Provided is a method of producing a fuel cell catalyst layer which has a large specific surface area and high activity and which includes the steps of: forming a dendritic structural member including a catalyst precursor by a vapor phase method; providing a coating layer on a surface of the dendritic structural member; and subjecting the dendritic structural member having the coating layer provided thereon to a reduction treatment. The dendritic structural member including a catalyst precursor is a dendritic structural member including platinum oxide or a dendritic structural member containing a composite oxide of platinum oxide and an element except platinum.

20 Claims, 40 Drawing Sheets

U.S. PATENT DOCUMENTS

| | | | |
|---|---|---|---|
| 2007/0134544 A1* | 6/2007 | Yamada et al. | 429/44 |
| 2007/0148531 A1 | 6/2007 | Yoshizawa et al. | |
| 2007/0212591 A1* | 9/2007 | Miyazaki et al. | 429/40 |

FOREIGN PATENT DOCUMENTS

| | | |
|---|---|---|
| JP | 2004-164854 A | 6/2004 |
| JP | 2006-049278 A | 2/2006 |
| JP | 2006-164575 A | 6/2006 |
| JP | 2006-332041 A | 12/2006 |
| JP | 2007-123196 A | 5/2007 |
| JP | 2007-179932 A | 7/2007 |
| JP | 2007-194197 A | 8/2007 |
| KR | 10-2005-0056584 A | 6/2005 |
| WO | 2006/004023 A1 | 1/2006 |
| WO | 2006/118346 A1 | 11/2006 |

OTHER PUBLICATIONS

Office Action in Chinese Application No. 200880019508.9 (Oct. 26, 2011).

Office Action in Korean Application No. 10-2010-7000379 (Oct. 20, 2011).

* cited by examiner

METHOD OF PRODUCING FUEL CELL CATALYST LAYER

TECHNICAL FIELD

The present invention relates to a method of producing a catalyst layer for a fuel cell (hereinafter, simply referred to as "fuel cell catalyst layer").

BACKGROUND ART

The fuel cell is expected to be a future energy-generation apparatus because the fuel cell has high energy conversion efficiency, is clean, and produces very little noise. Fuel cells have recently been used not only as automotive and residential power generators, but have also been installed into small electrical equipments such as mobile phones, notebook personal computers, and digital cameras because of their high energy density to possibly operate for a longer period of time than a conventional secondary battery, and have been attracting attention. However, further cost reduction is required for a fuel cell used as an automotive or residential power generator, and the amount of catalysts uses is desirably reduced as a way for cost reduction. Practical application of a fuel cell as a generator for small electrical equipments requires the size reduction of an entire system and the improvement of power generation efficiency.

Hitherto, an attempt has been made at forming a catalyst into fine particles and carrying the catalyst on carbon particles or the like to attain three-dimensional dispersion, to thereby increase the surface area and improve the catalyst utilization efficiency. Meanwhile, another attempt has been made at forming a catalyst layer into a very small thickness of about several µm, to thereby facilitate the substance transport. Further, a catalyst layer was gathered in the vicinity of a polymer electrolyte membrane, to thereby increase an effective surface area of the catalyst. Particularly when a fuel cell is to be installed in a small-sized electric equipment, the fuel cell itself needs to be small in size, and air is often supplied to an air electrode from air holes through natural diffusion (air breathing system) without use of a pump or a blower. In this case, substance transport at the air electrode often becomes a reaction rate-determining factor, and the thickness reduction of a catalyst layer seems to be effective means. In contrast to this, a vapor phase method such as sputtering is effectively used as means for forming a thin film and a method of producing a thin film catalyst layer having a large specific surface area and high activity by sputtering is disclosed in Japanese Patent Application Laid-Open No. 2006-49278.

DISCLOSURE OF THE INVENTION

In Japanese Patent Application Laid-Open No. 2006-49278, platinum oxide having a dendritic structure is formed by sputtering and reduced to platinum by hydrogen to be used as a catalyst. However, the dendritic structure greatly collapses at the time of reduction and its surface area is greatly reduced with the result that desired catalytic activity is not obtained.

The present invention has been accomplished in view of the above situation, and it is an object of the invention to provide a method of producing a fuel cell catalyst layer which has a large specific area and high activity while maintaining its dendritic structure even after the reduction.

The present invention provides a method of producing a fuel cell catalyst layer, which includes the steps of: forming a dendritic structural member including a catalyst precursor by a vapor phase method; providing a coating layer on a surface of the dendritic structural member; and subjecting the dendritic structural member having the coating layer provided thereon to a reduction treatment.

In the present invention, it is preferable that the dendritic structural member including a catalyst precursor is a dendritic structural member containing a platinum oxide or a dendritic structural member containing a composite oxide of platinum oxide and an element except platinum.

Further, it is preferable that the vapor phase method is a sputtering method.

Moreover, it is preferable that the coating layer is formed of an electrolyte having proton conductivity.

Further, it is preferable that the electrolyte having proton conductivity contains at least a perfluorosulfonic acid polymer.

Moreover, it is preferable that the electrolyte having proton conductivity contains at least a hydrocarbon-based polymer electrolyte.

Further, it is preferable that the step of subjecting the dendritic structural member having the coating layer provided thereon to a reduction treatment includes the step of electrochemically reducing the dendritic structural member with protons and electrons.

Moreover, it is preferable that the step of electrochemically reducing the dendritic structural member including a catalyst precursor with protons and electrons includes a two-stage reduction process.

Further, it is preferable that the two-stage reduction process includes a first stage of reducing the surface of the catalyst precursor and a second stage of reducing the inside of the catalyst precursor.

Moreover, it is preferable that the step of subjecting the dendritic structural member having the coating layer provided thereon to a reduction treatment includes the step of bringing a gas containing a reducing agent into contact with the dendritic structural member to effect reduction.

Further, it is preferable that the step of subjecting the dendritic structural member having the coating layer provided thereon to a reduction treatment includes the step of bringing a solution containing a reducing agent into contact with the dendritic structural member to effect reduction.

Moreover, it is preferable that the thickness of the coating layer is 1 nm or more and 200 nm or less.

Another aspect of the present invention provides a method of producing a fuel cell catalyst layer, which includes the steps of: forming a dendritic structural member including a catalyst precursor by a vapor phase method; providing a coating layer including an electrolyte with proton conductivity on a surface of the dendritic structural member; applying the dendritic structural member having the coating layer provided thereon to at least one surface of a polymer electrolyte membrane to form a membrane electrode assembly precursor; incorporating the membrane electrode assembly precursor into a fuel cell unit; and energizing the fuel cell unit.

It is preferable that the energization is performed in two stages.

Further, it is preferable that the energization is performed by supplying hydrogen to an anode electrode of the fuel cell unit and sweeping a current.

Moreover, it is preferable that the method of producing the fuel cell catalyst layer further includes, between the step of forming the dendritic structural member including the catalyst precursor by the vapor phase method and the step of providing the coating layer on the surface of the dendritic structural member, the step of providing to the surface of the dendritic structural member an Si compound including Si, —OH bonded to the Si or a group which is bonded to the Si and becomes —OH through hydrolysis, and a hydrophobic group.

Further, it is preferable that the method of producing the fuel cell catalyst layer further includes, between the step of providing the coating layer on the surface of the dendritic structural member and the step of subjecting the dendritic structural member having the coating layer provided thereon to the reduction treatment, the step of providing to the surface of the dendritic structural member an Si compound comprising Si, —OH bonded to the Si or a group which is bonded to the Si and becomes —OH through hydrolysis, and a hydrophobic group.

Moreover, it is preferable that the group which becomes —OH through hydrolysis is any one of —H, —OR (R: alkyl group having 6 or less carbon atoms) and —Cl.

According to the present invention, there can be provided a method of producing a fuel cell catalyst layer which has a large specific area and high activity while maintaining its dendritic structure even after the reduction.

Other features and advantages of the present invention will be apparent from the following description taken in conjunction with the accompanying drawings, in which like reference characters designate the same or similar parts throughout the figures thereof.

BEST MODE FOR CARRYING OUT THE INVENTION

The present invention is described in detail hereinafter.

A method of producing a fuel cell catalyst layer according to a first embodiment of the present invention includes the steps of: forming a dendritic structural member including a catalyst precursor by a vapor phase method; providing a coating layer on a surface of the dendritic structural member; and subjecting the dendritic structural member having the coating layer provided thereon to a reduction treatment.

The method of producing a fuel cell catalyst layer according to an embodiment of the present invention is described in detail hereinunder with reference to the accompanying drawings. In the following description, a case where the fuel cell is a polymer electrolyte fuel cell is taken as an example. However, it should be understood that the scope of the invention is not limited only to the materials, sizes, shapes, relative positions, etc. of constituent members described in this embodiment unless otherwise noted specifically.

A description is first given of the constitution of a polymer electrolyte fuel cell having a unit cell structure.

Figure 1:
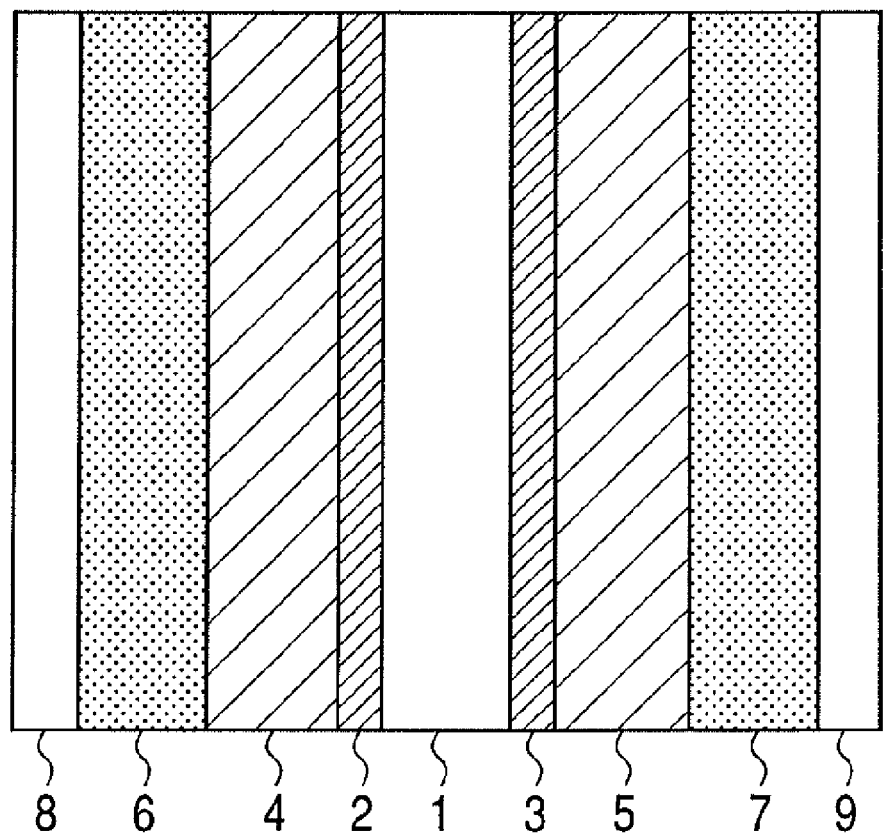
FIG. 1 is a schematic cross-sectional view illustrating an example of the construction of a single unit of a polymer electrolyte fuel cell manufactured by using the catalyst layer of the present invention.

FIG. 1 is a diagram showing the sectional construction of the polymer electrolyte fuel cell having a unit cell structure.

In FIG. 1, reference numeral 1 denotes a polymer electrolyte membrane, and a pair of catalyst layers (that is, a cathode-side catalyst layer 2 and an anode-side catalyst layer 3) are disposed so as to sandwich the polymer electrolyte membrane 1. Gas diffusion layers 4 and 5 are disposed on the outer sides of the cathode-side catalyst layer 2 and the anode-side catalyst layer 3, and an oxygen supply layer 6 and a fuel supply layer 7 are disposed on the outer sides of the gas diffusion layers 4 and 5, respectively. Current collectors 8 and 9 are disposed in contact with the oxygen supply layer 6 and the fuel supply layer 7, respectively.

Although in this embodiment a case where the catalyst layer having a dendritic structure is disposed only on the cathode (air electrode) side is described, the arrangement of the catalyst layers of the present invention is not limited to this. For example, the present invention includes a case where the catalyst layers having a dendritic structure of the present invention are disposed on the both electrode sides or a case where the catalyst layer having a dendritic structure of the present invention is arranged only on the anode side, and various constitutions may be preferably selected.

The polymer electrolyte membrane 1 has the function of conveying protons ($H^+$) produced on the anode side to the cathode side. The polymer electrolyte membranes 1 can be roughly classified into fluorine-based polymer electrolyte membranes and hydrocarbon-based polymer electrolyte membranes. As the fluorine-based polymer electrolyte membrane, there can be included films of perfluorocarbon sulfonic acid polymers such as Nafion (trade name; manufactured by DuPont CO., Ltd.), Flemion (trade name; manufactured by ASAHI GLASS CO., LTD), and Aciplex (trade name; manufactured by Asahi Kasei Corporation.), perfluorocarbon phosphonic acid polymers, trifluorostyrene sulfonic acid polymers, ethylene tetrafluoroethylene-g-styrenesulfonic acid polymers, an ethylene-tetrafluoroethylene copolymer, polyvinylidene fluoride perfluorocarbon sulfonic acid polymers, and the like.

On the other hand, as the hydrocarbon-based polymer electrolyte membrane, for example, there can be included films of sulfonated polysulfones, sulfonated polyether sulfones, sulfonated polyaryl ether sulfones, sulfonated polyaryl ether ketones, sulfonated polybenzeimidazole alkyls, phosphonated polybenzimidazole alkyls, sulfonated polystyrenes, sulfonated polyetherether ketones, sulfonated polyphenylenes, and sulfonated polyphenylene oxides.

In the present invention, both the fluorine-based and hydrocarbon-based polymer electrolyte membranes may be used as the polymer electrolyte membrane. Electrolytes may be used alone or in combination of two or more. A fluorine-based and hydrocarbon-based copolymer structure or a pore filling membrane using a porous support membrane may also be used.

The gas diffusion layers 4 and 5 have such functions as gas diffusion, water permeation, moisture retention, and current collection. That is, they are members which are required to supply a fuel gas or an oxidizer gas to a reaction area of a catalyst uniformly and sufficiently in order to effect an electrode reaction efficiently, to discharge excessive reaction product water from the catalyst layer efficiently, to prevent drying of the polymer electrolyte membrane, and to extract charge generated by the electrode reaction to the outside of the cell efficiently. To meet these requirements, the gas diffusion layer generally consists of a support layer and a microporous layer having a smaller average pore diameter than that of the support layer. The support layer is preferably constituted of a conductive carbon base material having a pore size distribution of 100 nm or more and 90 µm or less, and water-repellent treated carbon cloth, carbon paper, carbon nonwoven cloth, etc. may be used. Further, the microporous layer is composed of fine carbon particles and a water repellant agent, and is preferably formed on the support layer so as to have a pore diameter distribution of 1 nm or more and 900 nm or less.

The oxygen supply layer 6 and the fuel supply layer 7 uniformly and sufficiently supply an oxidizer gas and a fuel gas to the surfaces of the gas diffusion layers, respectively, and have the function of current collecting. As the oxygen supply layer 6 or the fuel supply layer 7, a porous metal material, for example, may be used. Such a porous metal material may be a metal foam. The metal foam is preferably formed of a metal material having a continuous pore structure open to the outside (open pores), and preferably has a pore diameter distribution of 10 µm or more and 1 mm or less and a porosity of 70% or more and 99% or less. Further, the above metal material is more preferably a conductive material having corrosion resistance and sufficient mechanical strength.

The current collectors 8 and 9 are formed of a conductive material such as metal or carbon and have the function of extracting electrons generated by the reaction of the fuel cell to the outside. Therefore, the current collectors 8 and 9 are disposed in contact with the oxygen supply layer 6 and the fuel supply layer 7, respectively, and have a terminal for taking out output to the outside.

The cathode-side catalyst layer 2 and the anode-side catalyst layer 3 each serve as a reaction site for a fuel cell reaction. The catalyst layer obtained by the present invention can be used as at least one of the cathode-side catalyst layer 2 and the anode-side catalyst layer 3. That is, the catalyst layer obtained by the present invention can be used only as the cathode-side catalyst layer 2 or only as the anode-side catalyst layer 3, or as both the cathode-side catalyst layer 2 and the anode-side catalyst layer 3.

Subsequently, description will be made of the method of producing a catalyst layer according to the present invention.

The method of producing a fuel cell catalyst layer according to the present invention includes the steps of:

(1) forming a dendritic structural member including a catalyst precursor by a vapor phase method;

(2) providing a coating layer on a surface of the dendritic structural member including the catalyst precursor; and (3) subjecting the dendritic structural member having the coating layer provided thereon to a reduction treatment.

(1) Regarding the step of forming a dendritic structural member including a catalyst precursor by a vapor phase method The term "dendritic structural member including a catalyst precursor" herein employed refers to a member that becomes (or turns into) a dendritic structural member formed of a catalyst which exhibits catalytic activity effective for a fuel cell reaction through a reduction treatment. Examples of such a catalyst precursor include platinum oxide and a composite oxide of platinum oxide and an element except platinum. That is, the dendritic structural member formed of the catalyst precursor is selected from a dendritic structural member formed of platinum oxide and a dendritic structural member formed of a composite oxide of platinum oxide and an element except platinum.

Examples of the element except platinum include B, C, N, Al, Si, P, Ti, V, Cr, Fe, Co, Ni, Cu, Zr, Nb, Mo, Ru, Rh, Pd, Ag, In, Sn, Hf, Ta, W, Re, Os, Ir and Au. The composite formation of platinum and any of these elements has the effect of improving poisoning resistance, durability, and catalytic activity. Since the required performance differs according to the use environment and intended use, the element to be used for the composite formation may be suitably selected.

The dendritic structural member including a catalyst precursor may contain a material except a catalyst precursor as long as it becomes a dendritic structural member formed of a catalyst which exhibits catalytic activity through a reduction treatment. The term "dendritic structural member" as employed herein refers to a branched rod-shaped structural member that has a longitudinal direction and a transverse direction. The size of the branch or branched piece of the dendrite may be 5 nm or more and 50 nm or less, more preferably 5 nm or more and 20 nm or less. Further, the porosity may be 30% or more and less than 90%, more preferably 55% or more and 75% or less.

Moreover, to form the dendritic structural member formed of the catalyst precursor, there is used a vapor phase method of depositing on a substrate a material vaporized (evaporated) by providing energy thereto. Of those, there is preferably used a reactive vapor phase method in which deposition on a substrate is carried out while allowing an evaporated material and a gas to reacted with each other. Examples of the reactive vapor phase method include a reactive sputtering method and a reactive vaporization method.

Incidentally, before the above coating layer is provided on the surface of the above dendritic structural member formed of the catalyst precursor, the above dendritic structural member formed of the catalyst precursor may be heat-treated at a temperature of 120° C. or more. By heat-treating the dendritic structural member formed of the catalyst precursor at a temperature of 120° C. or more, impurities adhered to the surface of the dendritic structural member formed of the catalyst precursor or the like can be removed and the provision of the coating layer can be carried out more uniformly. The heat treatment is carried out preferably in air or an inert gas atmosphere.

In addition, it is preferred that before the reduction treatment (in other words, between the steps (1) and (2) or between the steps (2) and (3)), the dendritic structural member formed of the catalyst precursor or the dendritic structural member formed of the catalyst precursor having the coating layer provided thereon is subjected to a hydrophobilizing treatment. Although the hydrophobilizing treatment may be carried out before the reduction treatment, a structural member obtained by reducing the dendritic structural member formed of the catalyst precursor having the coating layer provided thereon may be hydrophobilized after the reduction treatment (in other words, after the step (3)). To carry out the hydrophobilizing treatment, there is employed a method in which the dendritic structural member formed of the catalyst precursor is brought into contact with a hydrophobic solution such as a dispersion of fluororesin fine particles (Polyflon (trade name); manufactured by Daikin Industries, Ltd.) or a method in which an Si compound having Si, —OH bonded to the Si or a group which is bonded to the Si and becomes —OH by hydrolysis, and a hydrophobic group (hereinafter, sometimes simply referred to as "Si compound") is applied.

Groups —OH's when the Si compound has Si—OH's (in other words, —OH's bonded to Si) or groups —OH's of Si—OH's formed by hydrolysis are polymerized by a dehydration condensation reaction between —OH's. Thereby, a siloxane polymer having hydrophobic groups and —Si—O— bonds (siloxane bonds) as the skeleton is formed on the surface of the dendritic structural member formed of the catalyst precursor or the dendritic structural member formed of the catalyst precursor having a coating layer provided thereon. Since the thus formed siloxane polymer has hydrophobic groups, a layer of the structural member formed of the catalyst precursor has hydrophobic property, thereby improving the water resistance. The term "hydrophobic property" as herein employed means that the water contact angle is 90° or more. Incidentally, it is to be noted that the siloxane polymer having hydrophobic groups and siloxane bonds may be sometime simply referred to as "hydrophobilizing agent" hereinafter. Examples of such a hydrophobic group include alkyl groups (such as linear alkyl group and phenyl group) and fluoroalkyl groups. Examples of the siloxane polymer having hydrophobic groups include alkylsilsesquioxanes, alkylsiloxanes and those obtained by the polymerization of a mixture thereof in a network form.

When the Si compound has a group which is bonded to Si and becomes (or turns into) —OH through hydrolysis, the group which is bonded to Si is hydrolyzed by using an acid contained in a proton conductive electrolyte, platinum oxide of the catalyst precursor layer or Pt contained in the platinum oxide as a catalyst to become —OH.

Examples of the group which is bonded to Si and becomes —OH by hydrolysis include —H, —OR (R: alkyl group having 6 or less carbon atoms), and —Cl.

Examples of the hydrophobic group include alkyl groups and fluoroalkyl groups. The alkyl groups may have a branched carbon chain or a double bond. The above Si compound may be a monomer, oligomer, or polymer such as a siloxane polymer having the above group or alkylsilane.

Specific examples of the Si compound include 2,4,6,8-tetraalkylcyclotetrasiloxane, 1,1,1,3,3,3-hexaalkyldisilazane, monoalkylsilane, dialkylsilane, trialkylsilane, polyalkylhydrogensiloxane, 2,4,6,8-tetraalkyltetraalkoxycyclotetrasiloxane, monoalkyltrialkoxysilane, dialkyldialkoxysilane, trialkylmonoalkoxysilane, polyalkylalkoxysiloxane, 2,4,6,8-tetraalkyltetrachlorocyclotetrasiloxane, monoalkyltrichlorosilane, dialkyldichlorosilane, trialkylmonochlorosilane, and polyalkylchlorosiloxane. The alkyl group of those compounds may be a fluoroalkyl group in which a part or all of the H atoms are substituted with F atoms.

To apply (or provide) the Si compound to the surface of the catalyst precursor layer, known methods such as a method in which the catalyst precursor layer is dipped in a solution of the Si compound, a method in which the above solution is applied to the catalyst precursor layer by dropping, brush coating, or spraying, and a method utilizing CVD (Japanese Patent Application Laid-Open Nos. 2006-332041, 1999-510643 and 2006-164575) may be employed.

Further, the Si compound having Si, —OH bonded to the Si or a group which is bonded to Si and becomes —OH through hydrolysis, and a hydrophobic group is applied preferably in an amount such that the Si/Pt molar ratio is 0.1 to 0.25.

This is because when the amount of the Si is too small, the hydrophobic property in the voids of the catalyst layer lowers, whereby flooding readily occurs in the catalyst layer, while when the amount is too large, the reaction surface area of the catalyst becomes small, whereby the catalyst utilization efficiency may lower.

As disclosed in Japanese Patent Application Laid-Open No. 2006-332041, when CVD is performed at room temperature using 2,4,6,8-tetramethylcyclotetrasiloxane as a source gas at a Si/Pt molar ratio of 0.1 to 0.25, for example, it is preferable that the contact time between the catalyst precursor layer formed of platinum oxide and the source gas is 3 to 5 minutes.

(2) Regarding the step of providing a coating layer on a surface of the dendritic structural member formed of the catalyst precursor The coating layer is formed on a surface of the dendritic structural member formed of the catalyst precursor.

By coating (or covering) the surface of the dendritic structural member formed of the catalyst precursor, the disorder of a structure caused at the time of reduction can be minimized during the reduction in the following step (3). That is, the conversion of the catalyst precursor into a catalyst can be carried out without breaking the shape of the dendritic structural member.

The reason is considered that by providing the coating layer on the surface, the strength of the dendritic structural member formed of the catalyst precursor improves, thereby making it possible to suppress the disorder of the structure caused by volume shrinkage between before and after a reduction reaction. Further, it is also considered that by providing the coating layer on the surface of the dendritic structural member formed of the catalyst precursor, the reduction rate can be controlled thereby suppressing drastic volume shrinkage and maintaining the dendritic structure. Since the dendritic catalyst layer obtained as described above maintains the dendritic structure, a catalyst layer can be provided which has a large specific surface area and high activity.

Examples of the material constituting such a coating layer include polymers, inorganic compounds, electrolytes having proton conductivity and mixtures thereof, each of which can be dissolved in water or an organic solvent. Of those, the electrolytes having proton conductivity are preferred. Examples of the electrolytes having proton conductivity include electrolytes having proton conductivity described for the examples of the above polymer electrolyte membrane and heteropoly acids having proton conductivity.

The reason why the material constituting the coating layer is preferably the electrolyte having proton conductivity is as follows. It is considered that when an electrolyte having proton conductivity is provided to the surface of the dendritic structural member formed of the catalyst precursor before the reduction treatment and then the reduction treatment is performed, the interaction between the catalyst and the electrolyte having proton conductivity can be made stronger than when the electrolyte having proton conductivity is provided to the catalyst obtained through the reduction treatment. Particularly, the surface of a dendritic structural member formed of platinum oxide obtained by sputtering exhibits higher hydrophilic property than platinum. Meanwhile, a functional group responsible for proton conductivity contained in the electrolyte, for example, a sulfonic acid group is hydrophilic and therefore has a remarkably high affinity with the surface of the dendritic structural member formed of platinum oxide. By carrying out reduction in a state where interaction between the dendritic structural member and the electrolyte is strong, a catalyst which cannot be realized by the prior art method, especially a catalyst layer having strong interaction between platinum and the electrolyte can be produced. It is considered that such a catalyst layer has a higher activity than a catalyst layer obtained by the prior art method.

It is desirable that the coating layer formed on the surface of the dendritic structural member formed of the catalyst precursor is provided to cover a surface area of at least 50% or more, preferably 70% or more, more preferably 90% or more of the entire surface area of the dendritic structural member formed of the catalyst precursor.

When the coating layer is not formed of an electrolyte having proton conductivity, it may be removed after a dendritic structural member formed of a catalyst is formed by carrying out a reduction treatment in order to improve the contact property between the catalyst obtained through the reduction and the electrolyte component.

The thickness of the coating layer is preferably 1 nm or more and 200 nm or less, more preferably 1 nm or more and 50 nm or less. When the thickness of the coating layer is larger than 200 nm, the diffusion of a reducing agent does not reach the surface of the dendritic structural member formed of the catalyst precursor in the reduction treatment after the coating, thereby making it difficult to effect reduction sufficiently. On the other hand, when the thickness is smaller than 1 nm, the diffusion rate of the reducing agent cannot be controlled, whereby the effect of the coating layer may not be obtained.

To provide the material constituting the coating layer on the surface of the dendritic structural member formed of the catalyst precursor, various known technologies may be employed. For example, when the material is an electrolyte having proton conductivity, there is generally employed a method in which a solution obtained by dissolving the electrolyte in a solvent is applied and dried, thereby enabling the coating layer to be formed uniformly with high controllability. As such a solvent, water, an organic solvent or a mixed solvent thereof may be used generally. The solvent may be suitably selected according to the composition and required thickness of the coating layer. Various known technologies such as dip coating, spin coating, and spray coating may be used to provide (or apply or coat) the electrolyte solution.

Further, it is desirable that before the coating layer is provided, the dendritic structural member formed of the catalyst precursor is heat-treated at a temperature of 120° C. or more.

By heat-treating the dendritic structural member formed of the catalyst precursor at a temperature of 120° C. or more, impurities adhered to the surface of the dendritic structural member formed of the catalyst precursor can be removed, whereby the coating layer can be provided more uniformly. At that time, it is desirable that the heat treatment is carried out in air or an inert gas atmosphere. Although the upper limit of the heat treatment temperature is not particularly limited, it may be 500° C., more preferably 350° C. This is because when the heat treatment temperature is more than 500° C., it may exceed the decomposition temperatures of the catalyst precursor, the base material forming the dendritic structural member and the water-repellent material formed on the surface. Since the heat treatment is aimed to remove impurities on the surface of the dendritic structural member formed of the catalyst precursor, it is considered that a satisfactory effect can be obtained even at a temperature of 120° C. or more and less than 200° C.

(3) Regarding the step of subjecting the dendritic structural member formed of the catalyst precursor having the above coating layer provided thereon to a reduction treatment The reduction treatment can be carried out by using various known technologies. Of those, a method in which the reduction treatment is carried out electrochemically by means of protons and electrons, a method in which the dendritic structural member is brought into contact with a gas containing hydrogen as a reducing agent and a method in which the dendritic structural member is brought into contact with a solution containing a reducing agent are preferred.

A detailed description is given of each of the above methods.

In the first reduction method, after at least the coating layer is provided on the surface of the dendritic structural member formed of the catalyst precursor, the reduction treatment is carried out electrochemically by use of protons and electrons.

In the first reduction method, the dendritic structural member formed of the catalyst precursor is reduced electrochemically with protons and electrons. Stated more specifically, the following method is employed. The dendritic structural member formed of the catalyst precursor having the coating layer on the surface obtained in the step (2) is placed on at least one surface of a polymer electrolyte membrane and a membrane electrode assembly precursor is produced and then incorporated into a fuel cell unit shown in FIG. 1. Further, an electrochemical reduction is then carried out in the state wherein the above membrane electrode assembly is incorporated in the fuel cell unit. The term "membrane electrode assembly precursor" herein employed generally refers to an assembly in which at least one of two catalyst layers of the so-called membrane electrode assembly having a polymer electrolyte membrane sandwiched between the catalyst layers, is a dendritic structural member formed of a catalyst precursor. Therefore, the polymer electrolyte membrane may be sandwiched between two dendritic structural members, each formed of the catalyst precursor, or between one catalyst layer and one layer formed of a dendritic structural member formed of a catalyst precursor. "At least one surface of the polymer electrolyte membrane" denotes at least one of the two opposing principle surfaces (surfaces having the largest areas) of the polymer electrolyte membrane.

A description is subsequently given of a case where a fuel cell unit is assembled by using a catalyst layer obtained from the dendritic structural member formed of the catalyst precursor having the coating layer provided thereon as a cathode and the catalyst precursor is reduced.

The membrane electrode assembly precursor consisting of the above dendritic structural member and the polymer electrolyte membrane is disposed such that the dendritic structural member formed of the catalyst precursor having the coating layer provided thereon is positioned at the cathode. Hydrogen gas is flown into the anode and electrons are moved from the anode to the cathode through an external circuit. Then, protons generated by the oxidation of hydrogen at the anode are moved to the cathode through the polymer electrolyte membrane, and the following reaction proceeds between the electrons and the protons to reduce the catalyst precursor to a catalyst (for example, platinum oxide is reduced to platinum). That is, the dendritic structural member formed of the catalyst precursor is converted into a dendritic structural member formed of a catalyst.

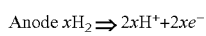

Anode $xH_2 \Rightarrow 2xH^+ + 2xe^-$

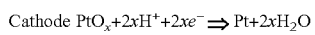

Cathode $PtO_x + 2xH^+ + 2xe^- \Rightarrow Pt + 2xH_2O$

Although the reduction reaction may be promoted swiftly by short-circuiting the anode and the cathode at this point, it is desirable that the reduction process is constituted of a first stage of reducing the surface of the above catalyst precursor and a second stage of reducing the inside of the catalyst precursor. In this case, it is preferred that the first-stage reduction is carried out in a state where the supply of oxygen to the surface of the dendritic structural member formed of the catalyst precursor is sufficient and that the second-stage reduction is carried out in an oxygen diffusion rate determining process in which the supply of oxygen to the surface of the dendritic structural member formed of the catalyst precursor is insufficient.

In the first reduction process, the surface of the above catalyst precursor is reduced. However, since the reduction proceeds by protons and electrons, a part of the surface to which protons are supplied, that is, a part where the above catalyst precursor and the proton conduction site of the polymer electrolyte are in contact with each other is reduced. The contact part between the proton conduction site and the catalyst is called "electrochemically effective surface area" and considered as a part which can contribute to a catalytic reaction.

In the second reduction process, the reduction proceeds in a state where the supply of oxygen to the above catalyst precursor is insufficient. However, because the supply of oxygen to the catalyst precursor is insufficient, oxygen inside of the catalyst precursor diffuses to the surface of the catalyst precursor and is reduced by protons and electrons. At this time, the site where the reduction reaction proceeds is the above electrochemically effective surface area and oxygen inside of the above catalyst precursor diffuses to the electrochemically effective surface area and is reduced. As a result, an effective path between platinum existing inside the catalyst and the electrochemically effective surface area is formed, whereby the utilization efficiency of the catalyst is improved and the catalytic performance is improved.

In contrast to this, when the reduction reaction is swiftly promoted by short-circuiting the anode and the cathode, because the permeation of hydrogen from the anode into the cathode proceeds simultaneously, the reduction reaction also proceeds in a part other than the electrochemically effective surface area and a part of the catalyst cannot contribute to the reaction, whereby sufficient catalytic performance cannot be exhibited.

Incidentally, the term "surface of dendritic structural member" herein employed refers to a part exposed to light when a dendritic structural member is irradiated with light from various directions, and the term "inside of dendritic structural member" employed herein refers to a part not exposed to light even when the dendritic structural member is irradiated with light from any direction.

A description is subsequently given of the second reduction method. In the second reduction method, after the coating layer is provided on the surface of the dendritic structural member formed of the catalyst precursor, a gas containing a reducing agent is brought into contact with the dendritic structural member formed of the catalyst precursor and having the coating layer provided thereon to effect reduction.

As the gas containing a reducing agent, a gas containing hydrogen or a gas containing any one of carbon monoxide, sulfur dioxide, and hydrogen iodide can be used. Of those, a gas containing hydrogen is preferred as the gas containing a reducing agent. When the gas containing hydrogen is used as the gas containing a reducing agent, the concentration of hydrogen is not limited, and a gas containing pure hydrogen or a mixed gas of an inert gas such as He or Ar and hydrogen may be used. From the viewpoint of the safety and handleability of the gas, a mixed gas of an inert gas and hydrogen can advantageously be used.

A description is subsequently given of the third reduction method. In the third reduction method, after the coating layer is provided on the surface of the above dendritic structural member formed of the catalyst precursor, a solution containing a reducing agent is brought into contact with the above dendritic structural member formed of the catalyst precursor and having the coating layer provided thereon to effect reduction.

As the solution containing a reducing agent, a solution containing hydrazine, hydroxylamine, sodium thiosulfate, citric acid, sodium citrate, L-ascorbic acid, tin chloride, sodium boron hydride, aldehydes such as formaldehyde, or alcohols such as methanol or ethanol can be used. A reducing agent in a powdery form can be dissolved in water or an organic solvent and used. A reducing agent in a solution form can be used as it is or diluted with water or an organic solvent before use. When a solution containing a reducing agent is brought into contact with the above dendritic structure formed of the catalyst precursor and having the coating layer provided thereon to effect reduction, care needs to be taken to prevent the poisoning of the surface of the catalyst or the degradation of the catalyst. For this reason, when a reducing agent which will adhere to the surface of the catalyst, a reducing agent containing sodium ion or potassium ion, or a reducing agent containing a chloride ion is to be used, suitable ingenuity is needed for the cleaning step after the reduction. Therefore, formaldehyde which has little influence upon the catalyst and the electrolyte may be advantageously used as the reducing agent.

When the dendritic structural member formed of the catalyst precursor is reduced by using a solution containing a reducing agent, a cleaning step is required in most cases. By cleaning the dendritic structural member formed of a catalyst with a large amount of water or an organic solvent, the reducing agent adhered to the surface of the reduced catalyst can be removed. When the conductivity of the proton conductive electrolyte which serves as the coating layer is reduced by ions or the like contained in the reducing agent, the conductivity can be restored, for example, by cleaning with a sulfuric acid aqueous solution.

EXAMPLES

The following examples are provided to further describe the present invention.

Example 1

In this example, a coating layer was formed on a dendritic structural member formed of platinum oxide and electrochemical reduction by protons and electrons was carried out to form a catalyst layer.

(Step 1)

First, a catalyst layer for a cathode (hereinafter, simply referred to as "cathode catalyst layer") was formed. A gas diffusion layer (LT-1200 W (trade name); manufactured by E-TEK Co., Ltd.) was used as a base material for forming a dendritic structural member composed of platinum oxide, and a dendritic structural member composed of platinum oxide as a catalyst precursor was formed in a thickness of 2 μm by a reactive sputtering method. The amount of carried Pt at this time was 0.68 mg/cm$^2$. The amount of carried Pt was measured by XRF (X-ray Fluorescence Analysis). The reactive sputtering was performed at a total pressure of 4 Pa, an oxygen flow rate percentage ($Q_{O2}/(Q_{Ar}+Q_{O2})\times 100$) of 70%, a substrate temperature of 25° C., and an input power of 4.9 W/cm$^2$. In accordance with a known technology disclosed in Japanese Patent Application Laid-Open No. 2006-332041, a Si compound was provided to the surface of the dendritic structural member to form a siloxane polymer (hereinafter, sometimes referred to as "hydrophobilizing agent"). That is, the obtained dendritic structural member composed of platinum oxide was brought into contact with vapor of 2,4,6,8-tetramethyltetracyclosiloxane at room temperature (vapor pressure: 1.2 kPa) in a closed vessel for 4 minutes to form the hydrophobilizing agent on the surface of the dendritic structural member. At this time, the Si/Pt molar ratio in the dendritic structural member was 0.18. Incidentally, the Si/Pt molar ratio in the dendritic structural member was measured by XRF (X-ray Fluorescence Analysis). Thereafter, the dendritic structural member composed of platinum oxide containing the hydrophobilizing agent was heat-treated at 120° C. for 1 hour.

Further, a 1 wt % solution of Nafion (trade name) (a 5% solution manufactured by Wako Pure Chemical Industries, Ltd. was diluted with isopropanol to a concentration of 1%) which was a proton conductive electrolyte was dropped on the dendritic structural member composed of platinum oxide in an amount of 16 μl per 1 cm$^2$ and the solvent was vaporized in vacuum. Thereby, a coating layer was formed on the surface of the dendritic structural member composed of platinum oxide.

When the catalyst having the coating layer provided thereon was observed by TEM (Transmission Electron Microscopy), the thickness of the coating layer was about 4 nm.

(Step 2)

Next, a catalyst layer for an anode (hereinafter, simply referred to as "anode catalyst layer") was formed. The anode catalyst layer was obtained by following the same procedure as in Step 1 with the exception that a PTFE sheet (Nitoflon (trade name); manufactured by Nitto Denko Corporation) was used as a base material for forming a dendritic structural member composed of platinum oxide and having a thickness of 500 nm and that a hydrophobilizing agent was not provided. The amount of carried Pt at this time was 0.17 mg/cm$^2$.

(Step 3)

The cathode catalyst layer and the anode catalyst layer prepared in Steps 1 and 2 were each cut into a piece with a predetermined area and placed on the both sides of a polymer electrolyte membrane (N112 (trade name); manufactured by DuPont) and the whole was hot-pressed (8 MPa, 150° C., 10 minutes), and the PTFE sheet used as the base material for the anode catalyst layer was removed to obtain a membrane electrode assembly.

(Step 4)

There was formed a single cell unit as with the structure shown in FIG. 1 in which carbon cloth (LT2500-W (trade name); manufactured by E-TEK Co., Ltd.) was disposed as an anode-side gas diffusion layer, metal foam (Celmet #5 (trade name); manufactured by Toyama Sumitomo Denko Co., Ltd.) was disposed as a cathode-side oxygen supply layer, and current collectors for the cathode and anode were further disposed on the outer sides thereof.

(Step 5)

The single cell unit obtained by the above steps was short-circuited for 5 minutes in a state where hydrogen gas was charged into the anode side in a dead-ended mode and the cathode side was opened to the atmosphere through the metal foam to perform a reduction reaction of the platinum oxide disposed at the cathode, thereby converting the platinum oxide into platinum.

After the membrane electrode assembly was fully dried, the characteristics of the single cell unit produced by the above steps were evaluated. Hydrogen gas was supplied to the anode electrode side, while the cathode electrode side was made open to the atmosphere, and the characteristics were evaluated at a temperature of 25° C. and a humidity of 50%.

As Comparative Example 1, catalyst layers were obtained by following the same procedure as in Example 1 with the exception that the reduction reaction conducted in Step 5 of Example 1 was carried out before the formation of the coating layer on the dendritic structural member composed of platinum oxide in Step 1 and the reduction reaction was conducted by exposing the cathode catalyst layer to hydrogen gas.

Figure 2:
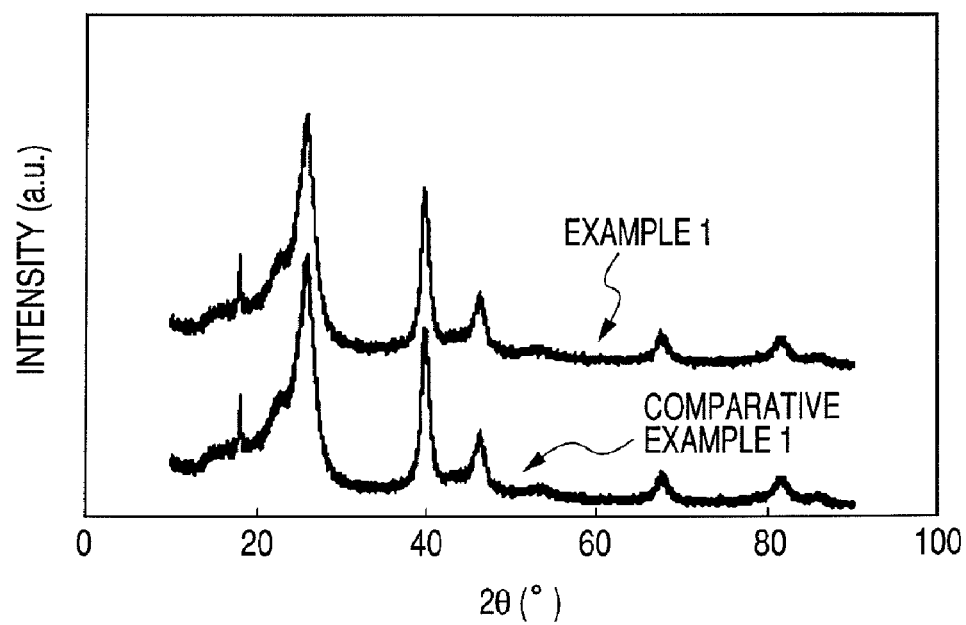
FIG. 2 is a graphical representation showing XRD patterns obtained by the structural analysis of the catalyst layers of Example 1 and Comparative Example 1.

FIG. 2 shows XRD (X-ray Diffraction) patterns of the catalyst layers reduced by the methods of Example 1 and Comparative Example 1. Since the both showed platinum patterns, it can be seen that platinum oxide was reduced to platinum in the both reduction methods. Further, it can also be seen that in both Example 1 and Comparative Example 1, the catalysts are each composed of only platinum and have the same composition.

FIGS. 3 to 5 show SEM (Scanning Electron Microscopy) photographs of the catalyst layers of Example 1 and Comparative Example 1 obtained as described above and the dendritic structural member formed of platinum oxide before reduction of Example 1.

Figure 3A:
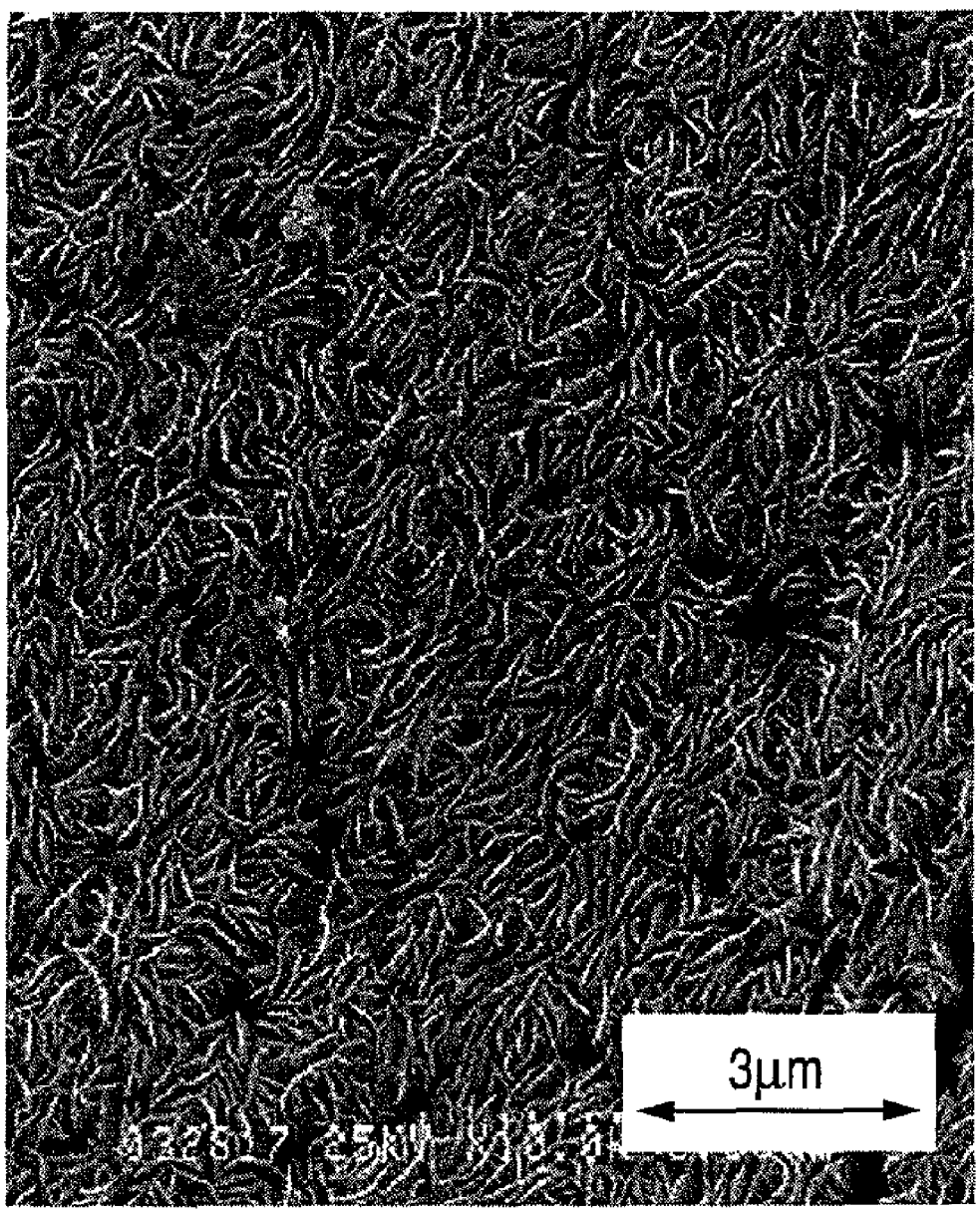
FIG. 3A is an SEM photograph of the catalyst layer of Example 1.
Figure 3B:
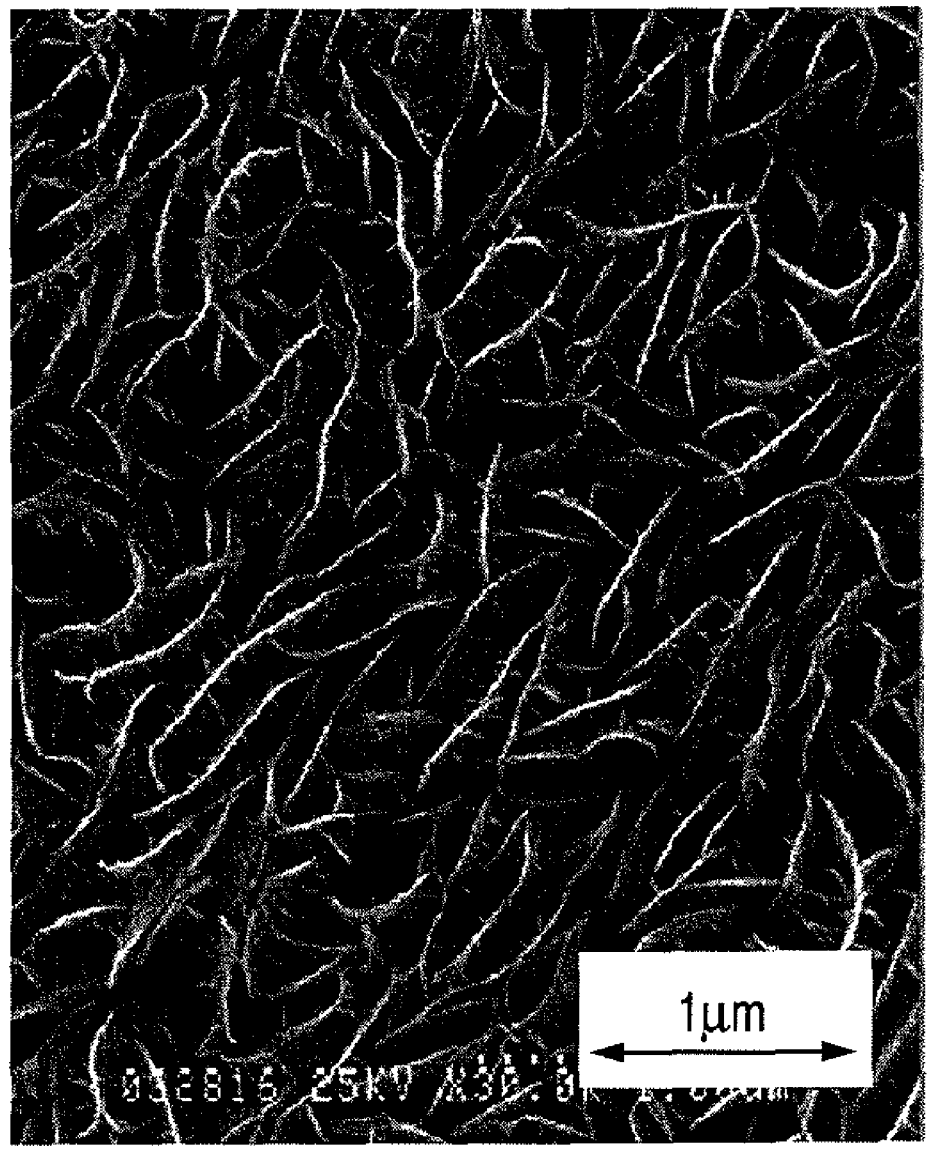
FIG. 3B is an SEM photograph of the catalyst layer of Example 1.

FIGS. 3A and 3B are SEM photographs of the catalyst layer (catalyst layer of Example 1) obtained by electrochemical reduction using protons and electrons after the formation of the coating layer on the dendritic structural member composed of platinum oxide.

Figure 4A:
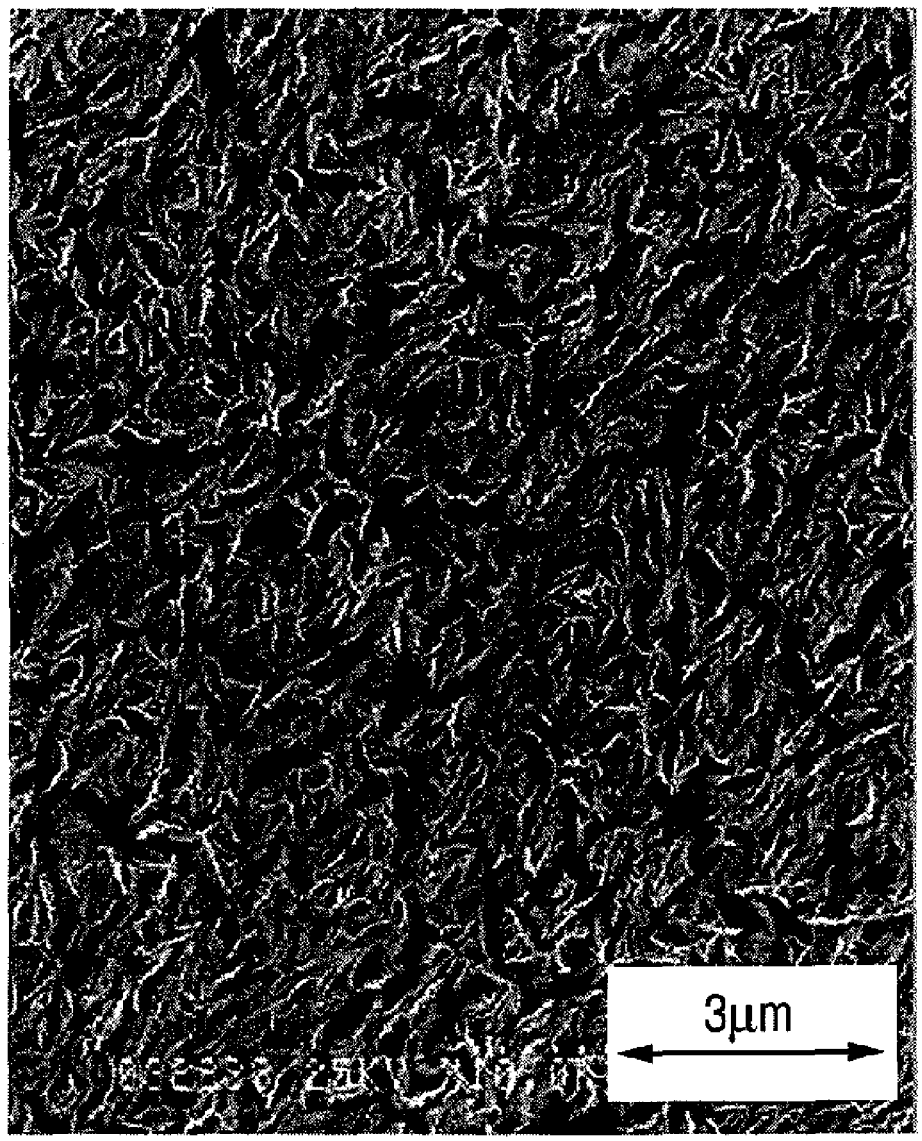
FIG. 4A is an SEM photograph of the catalyst layer of Comparative Example 1.
Figure 4B:
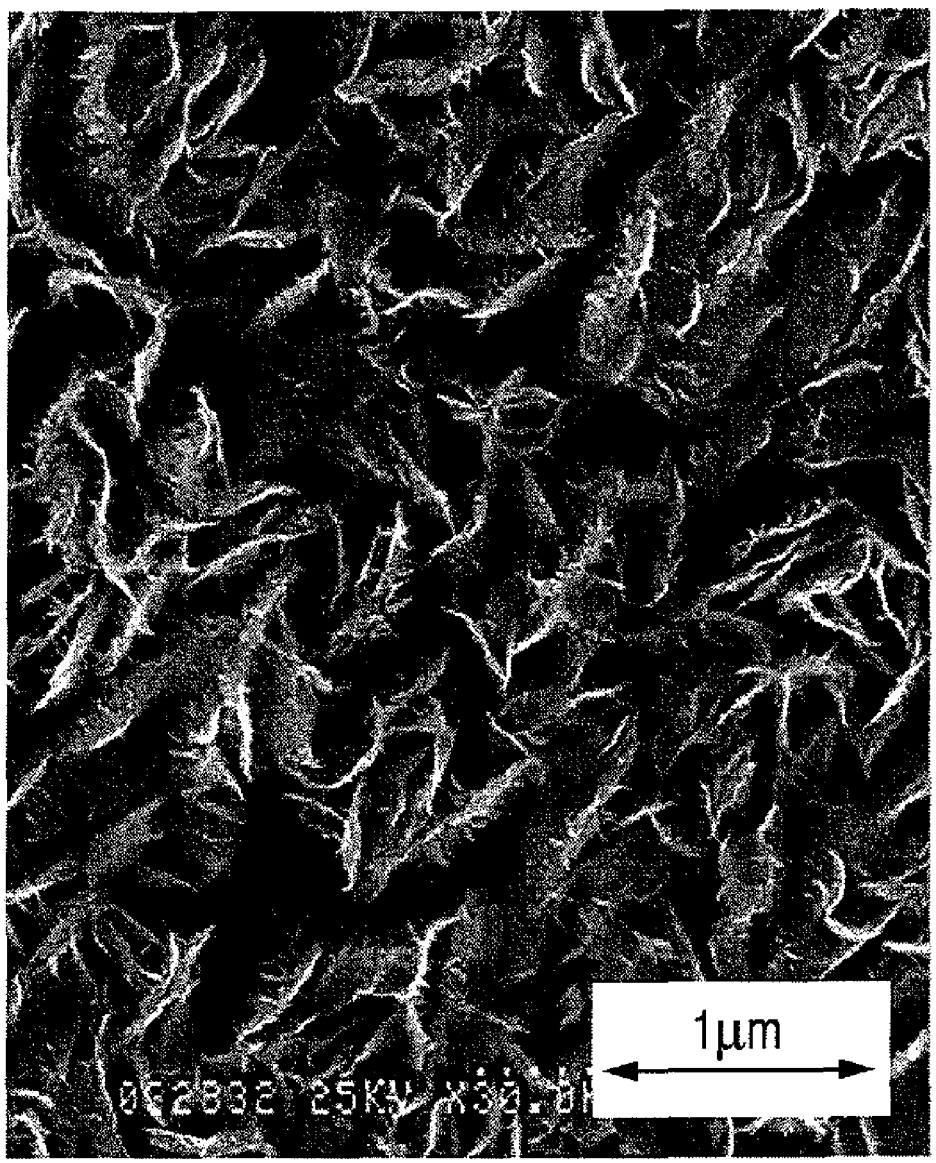
FIG. 4B is an SEM photograph of the catalyst layer of Comparative Example 1.

FIGS. 4A and 4B are SEM photographs of the catalyst layer (catalyst layer of Comparative Example 1) on which the coating layer was formed after the dendritic structural member composed of platinum oxide was reduced by hydrogen gas.

Figure 5A:
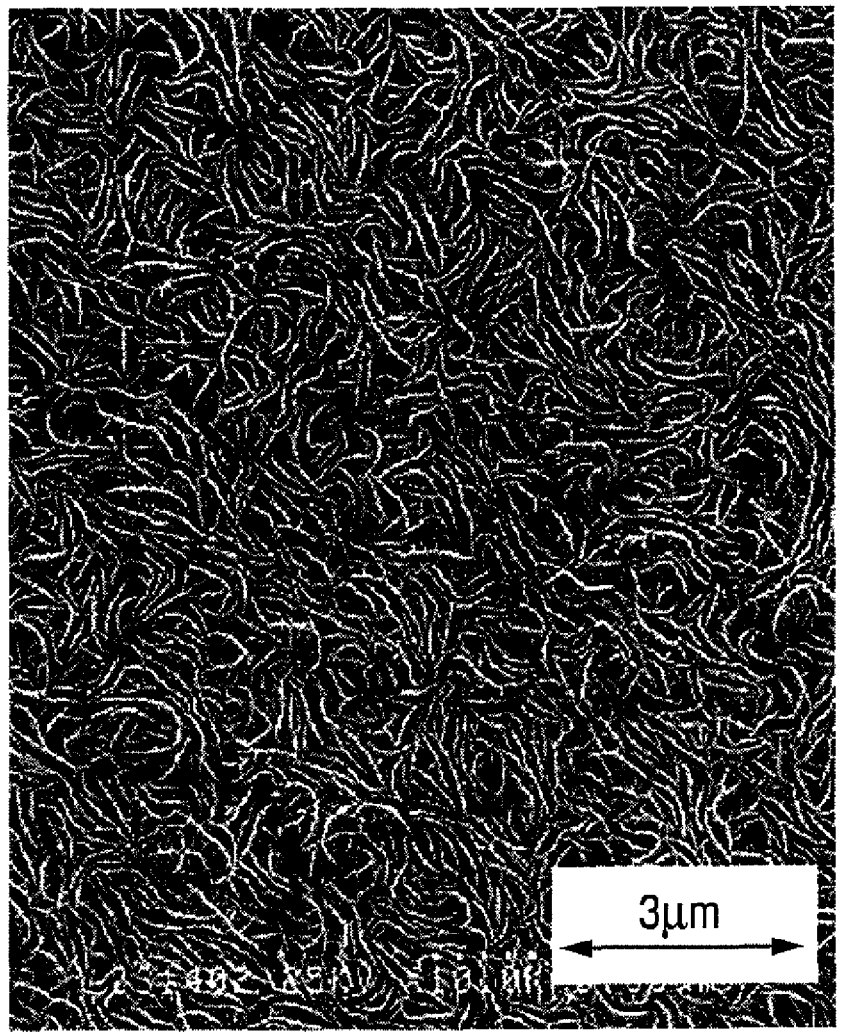
FIG. 5A is an SEM photograph of a dendritic structural member formed of platinum oxide before reduction in Example 1.
Figure 5B:
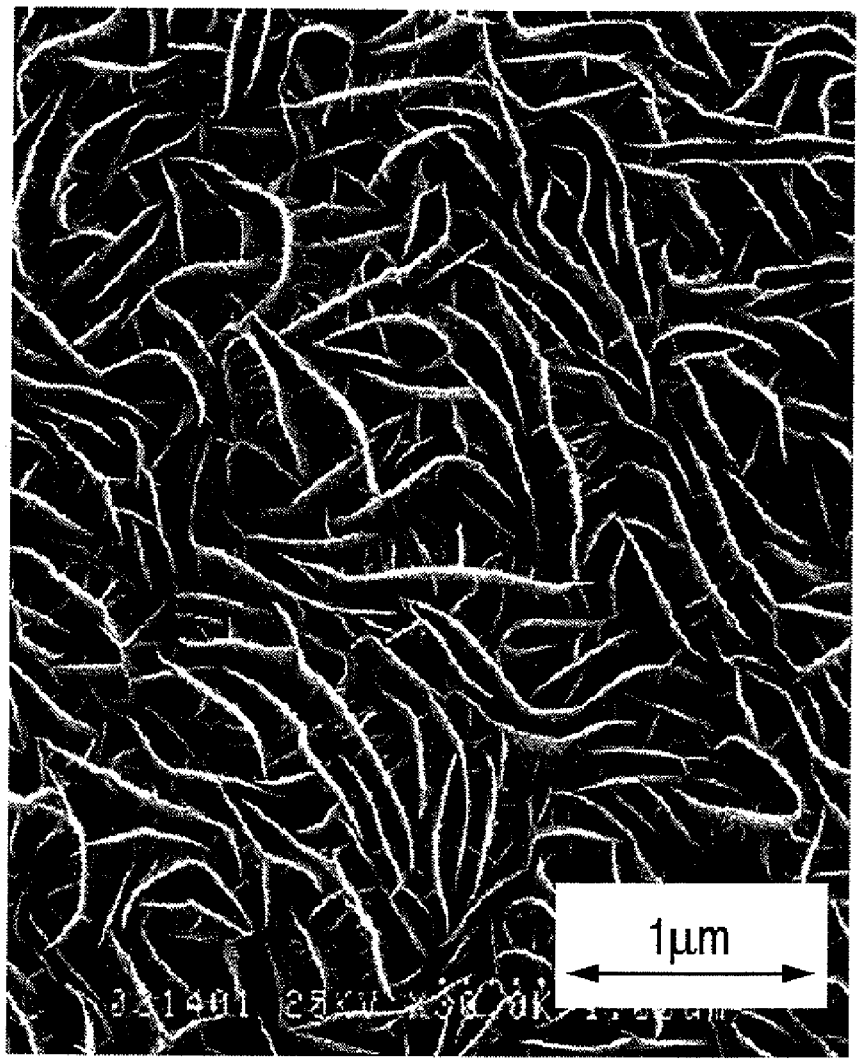
FIG. 5B is an SEM photograph of the dendritic structural member formed of platinum oxide before reduction in Example 1.

FIGS. 5A and 5B are SEM photographs of the dendritic structural member composed of platinum oxide before the reduction of Example 1.

It can be seen that the structure of the catalyst layer reduced by hydrogen gas of Comparative Example 1 greatly collapsed as compared with the dendritic structural member composed of platinum oxide before the reduction whereas the catalyst layer of Example 1 maintained a fine dendritic structure as with the dendritic structural member composed of platinum oxide before the reduction.

Figure 6:
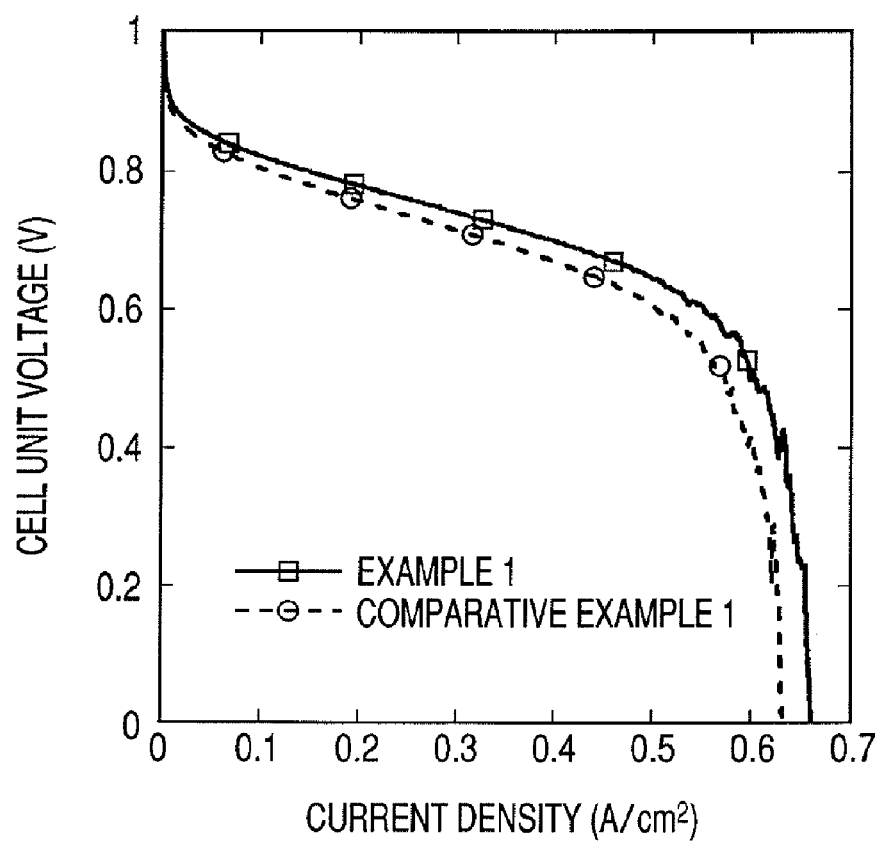
FIG. 6 is a graphical representation showing I-V curves indicating the cell characteristics of polymer electrolyte fuel cells manufactured by using the catalyst layers of Example 1 and Comparative Example 1.

The cell characteristics of polymer electrolyte fuel cells assembled using these catalyst layers were compared with each other in terms of I-V curves shown in FIG. 6. Incidentally, each I-V curve was obtained by drawing an I-V curve several times and selecting one obtained when the water content in the electrolyte membrane became constant and the performance became stable. As shown in FIG. 6, it can be seen that in Example 1, the characteristics improved at both a low current range and a high current range and the catalytic activity improved. Further, when the effective surface area was compared with each other by means of cyclic voltammetry, it was 19.2 m$^2$/g in Comparative Example 1 and 23.4 m$^2$/g in Example 1. From these results, it is understood that a highly active catalyst layer having a large specific surface area while maintaining a fine dendritic structure can be obtained by reducing the dendritic structural member composed of platinum oxide electrochemically using protons and electrons.

Example 2

Example 2-1

This example is a second example of the embodiment in which the dendritic structural member is reduced electrochemically using protons and electrons described in Example 1. Stated more specifically, by allowing a current to flow in a cell while applying a current sweep, the surface of the dendritic structural member composed of the catalyst precursor having the coating layer provided thereon is reduced, and then the reduction is continued in a state wherein oxygen is diffused into the inside of the catalyst precursor, thereby obtaining a catalyst layer.

Since Steps 1 to 4 are identical to those of Example 1, only Step 5 is described.

(Step 5)

In a state where hydrogen was charged in the anode side of the single cell unit obtained by Steps 1 to 4 above in a dead-ended mode and the cathode side was made open to the atmosphere through the metal foam, a current was allowed to flow therein by applying a current sweep at a sweep rate of 0.1 mA/s·cm$^2$ to carry out a reduction reaction of the dendritic structural member composed of the catalyst precursor, thereby converting the platinum oxide into platinum.

After the membrane electrode assembly was fully dried, the characteristics of the single cell unit produced by the above steps were evaluated. The characteristics were evaluated by supplying hydrogen gas to the anode electrode side and making the cathode electrode side open to the atmosphere at a temperature of 25° C. and a humidity of 50%.

Figure 7:
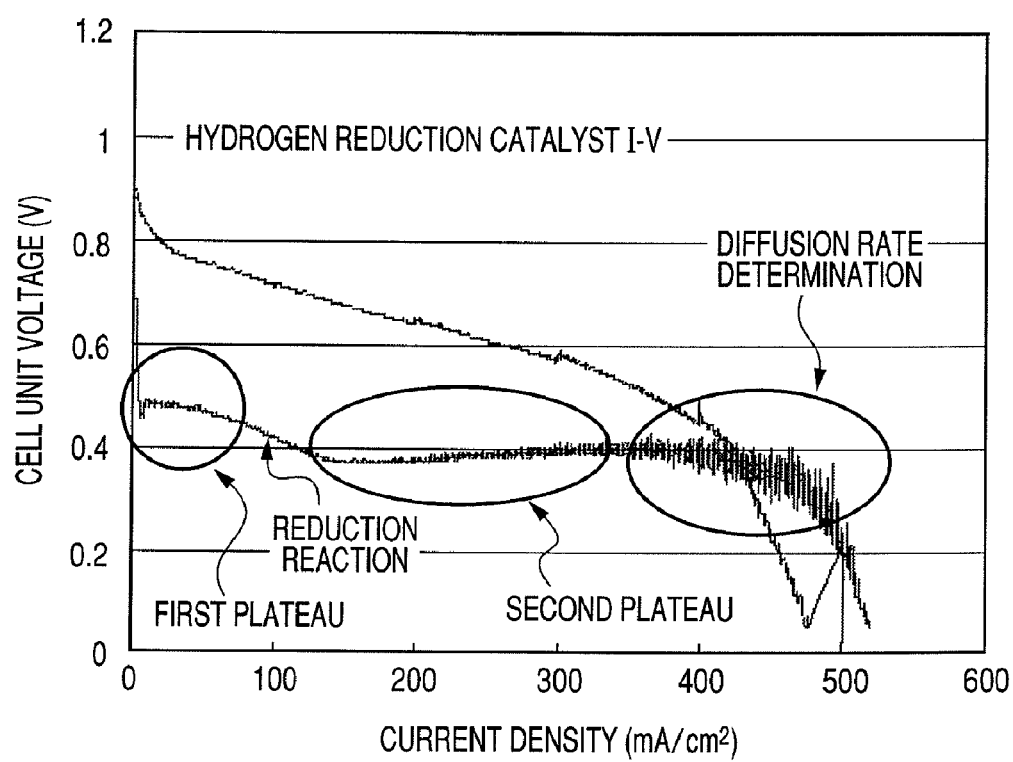
FIG. 7 is a graphical representation showing I-V curves obtained when platinum oxide of the dendritic structural member formed of platinum oxide is reduced to platinum by a current sweep in Example 2.

FIG. 7 shows an I-V curve when the reduction reaction was carried out at the sweep rate of 0.1 mA/s·cm$^2$. Further, also for the catalyst subjected to the reduction reaction to platinum by exposure to hydrogen, an I-V curve obtained under the same conditions is shown in FIG. 7.

As can be seen from FIG. 7, the I-V curve of the reduction reaction shows a specific profile as compared with the ordinary I-V curve and has a first plateau region at a current density from 0 to 150 mA/cm$^2$, a second plateau region at a current density from 150 to 350 mA/cm$^2$, and a diffusion rate determining region at a current density of 350 mA/cm$^2$ or more where the potential becomes unstable, which is considered to be attributed to insufficient oxygen supply.

Figure 8:
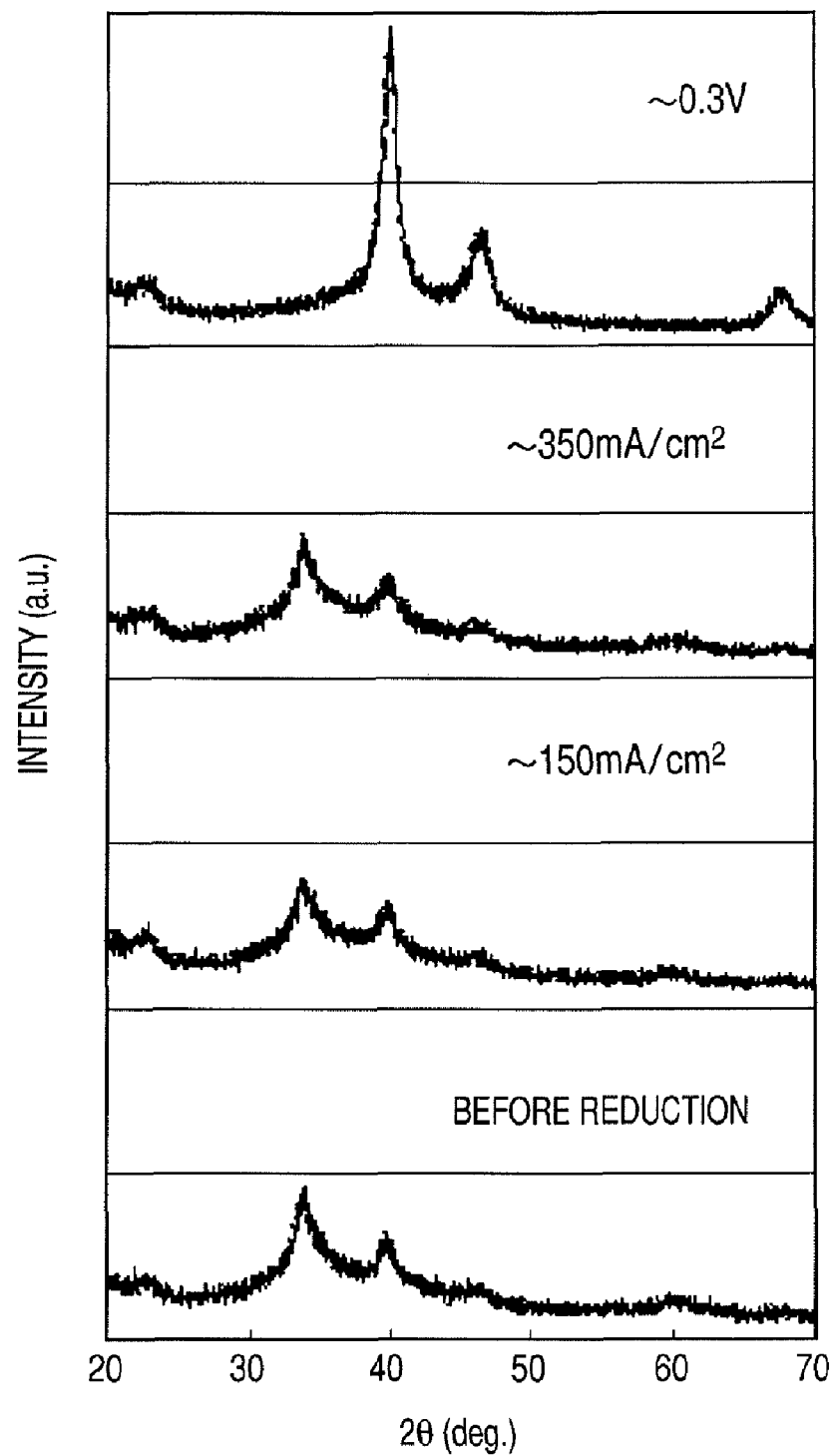
FIG. 8 is a graphical representation showing XRD patterns of a catalyst precursor when reduced to a predetermined current value in the process of reducing platinum oxide of the dendritic structural member formed of platinum oxide to platinum by a current sweep in Example 2.

Whether the reduction reaction proceeded or not in these regions was checked by XRD structural analysis. The results of the analysis are shown in FIG. 8. As shown in FIG. 8, an XRD pattern of platinum oxide is obtained in the stage where the current flowed at a current density up to 350 mA/cm$^2$ as is the case with that before reduction. In contrast to this, an XRD pattern of platinum is obtained when the current is swept up to 0.3 V which is within the diffusion rate determining region where the oxygen supply to the surface of the dendritic structural member composed of the catalyst precursor is insufficient. Therefore, it can be seen that the reduction reaction for converting platinum oxide into platinum proceeds in the diffusion rate determining process. (Thereby, the second reaction, that is, the reaction of further reducing the inside takes place at 0.3 V or less, and 350 mA/cm$^2$ or more in the present cell configuration.)

Figure 9:
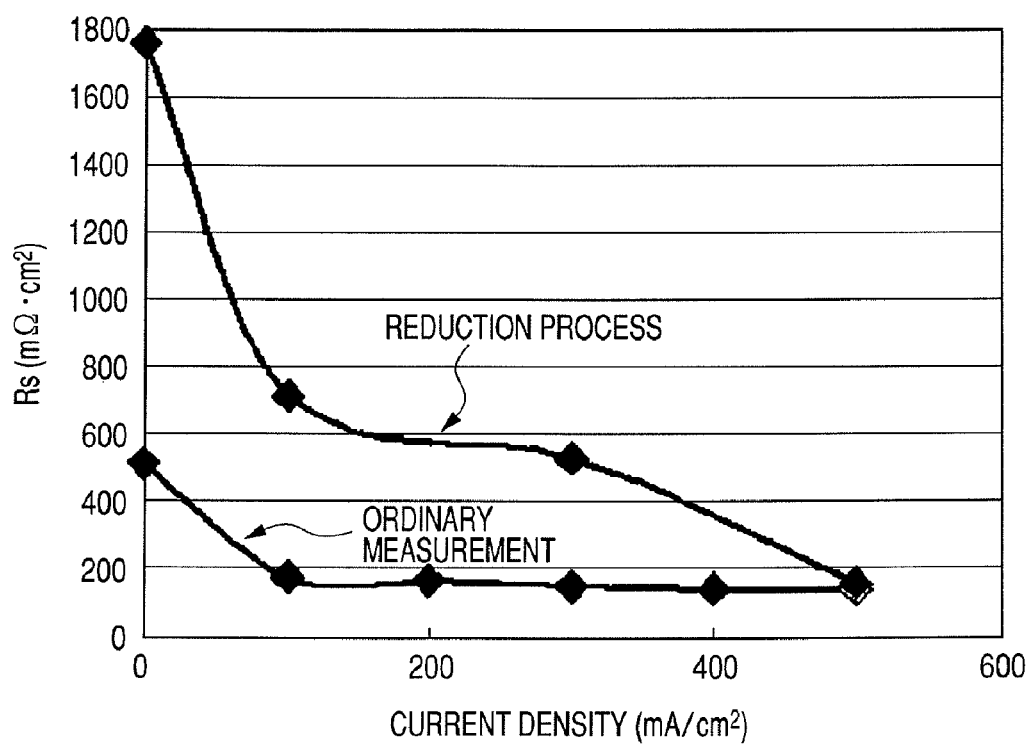
FIG. 9 is a diagram showing internal resistance Rs in the process of reducing platinum oxide of the dendritic structural member formed of platinum oxide to platinum by a current sweep in Example 2.

FIG. 9 shows the relationship between the current density and the internal resistance Rs in the reduction process and the ordinary measurement. In the reduction process, the resistance before the sweep became extremely high as compared with that after the completion of the reduction from platinum oxide to platinum. This is attributed to that the electric resistance of platinum oxide is much higher than the resistance of platinum. The Rs of the platinum catalyst after the completion of the reduction was reduced by 334 mΩ·cm$^2$ by allowing a current flow at 100 mA/cm$^2$. The reason is considered to be that the resistance was reduced due to the wetting of the electrolyte membrane with water generated in the cathode electrode by the current flow. Since the resistance became almost constant thereafter, it is considered that the electrolyte membrane was almost completely wetted with water generated at 100 mA/cm$^2$. In contrast to this, in the process of reducing the catalyst precursor, a reduction in resistance as large as 1045 mΩ·cm$^2$ was observed by allowing a current to flow at 100 mA/cm$^2$. It is assumed from the result of analysis of the platinum catalyst obtained after the completion of the reduction that since the reduction in resistance caused by the wetting of the membrane was about 330 mΩ·cm$^2$, the difference was due to the partial reduction of platinum oxide to platinum. Further, since the resistance gradually decreased by allowing a current to flow, it can be seen that the reduction of platinum oxide to platinum proceeded by the current flowing. However, an XRD pattern of platinum oxide is obtained before the diffusion rate determining process is reached as is seen from the above above-mentioned results. The reason is considered to be that because the reduction before the diffusion rate determining process was reached occurred in a very small portion of the surface of the catalyst precursor, it was not detected by XRD. Therefore, it is considered that in the catalyst precursor in the stage before the diffusion rate determining process in which the oxygen supply to the surface of the catalyst precursor was sufficient, a reduction reaction in which only the surface of the dendritic structural member composed of the catalyst precursor is reduced by protons and electrons and a fuel cell reaction occurred at the same time. It is also considered that in the diffusion rate determining process in which the oxygen supply is insufficient, because oxygen on the surface of the catalyst precursor is insufficient, oxygen in the inside of the catalyst precursor moves to the surface to allow the reduction reaction to proceed, whereby the reduction completely proceeds also at the inside.

Figure 10:
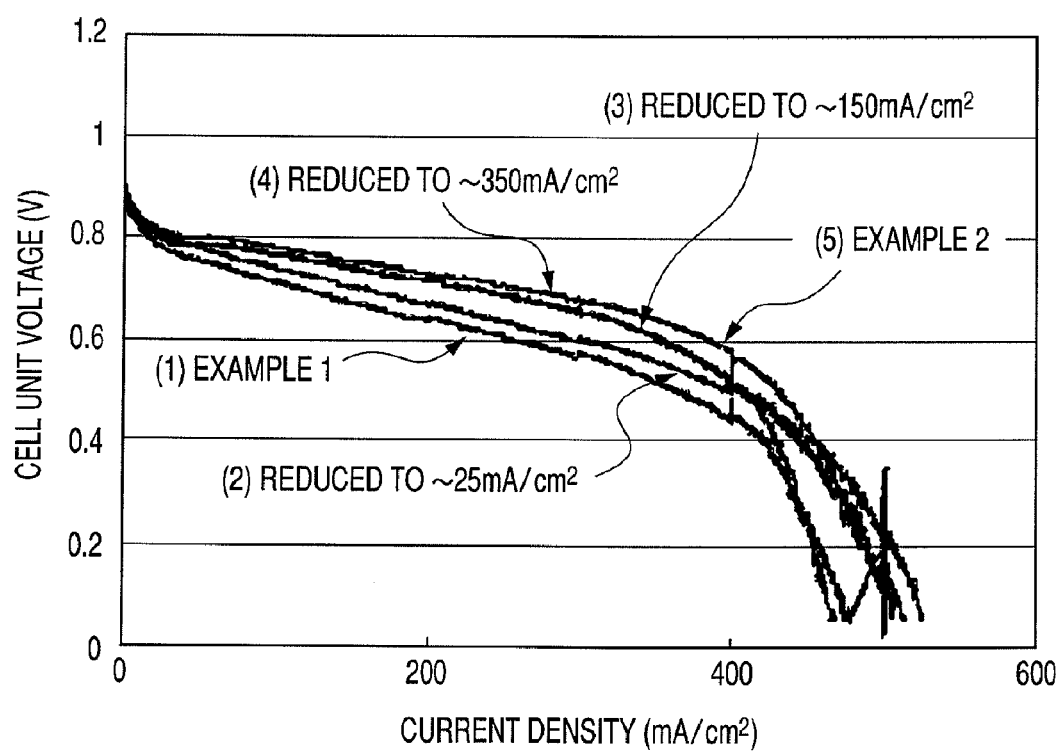
FIG. 10 is a graphical representation showing I-V curves indicating the characteristics of the catalyst layer obtained by reducing platinum oxide of the dendritic structural member formed of platinum oxide to platinum by a current sweep in Example 2 and the characteristics of the catalyst layer of Example 1.

In FIG. 10, (5) shows the characteristics of the catalyst obtained by reducing the inside by the diffusion rate determining process after the reduction of the surface of the catalyst precursor of the present example as described above. Incidentally, in FIG. 10, (1) shows a case where the reduction reaction was carried out while short-circuiting the fuel cell unit for 5 minutes as described in Example 1. Further, as the other reduction methods, (2), (3), and (4) each show I-V characteristics of a catalyst obtained by reducing the surface of the dendritic structural member composed of the catalyst precursor while sweeping a current at 0 to 25 mA/cm$^2$, 0 to 150 mA/cm$^2$, and 0 to 350 mA/cm$^2$, respectively and then short-circuiting the cell unit for 5 minutes to promote the reduction reaction of the inside of the dendritic structural member composed of the catalyst precursor.

When the above characteristics are compared with one another, the result is (5)>(4)≈(3)>(2)>(1). It is understood from this result that the characteristics were enhanced more when the first and second plateaus were ended by allowing a current to flow at 150 mA/cm$^2$ or more in (3), (4) and (5) than when a current was swept up to 0 to 25 mA/cm$^2$ in (2) during the first plateau or when the cell was short-circuited without sweeping a current in (1). Since (3) (4), it is considered that the reduction of the surface fully proceeded in the first plateau at 0 to 150 mA/cm$^2$. The specific surface areas of (1), (2), (4) and (5) by CV were measured to be (1): 23.4 m$^2$/g; (2): 25.5 m$^2$/g; (4): 28.22 m$^2$/g; (5): 27.51 m$^2$/g. Therefore, it can be seen that the specific surface area became larger and the characteristics improved at the same time as the current density increased in the order of (1), (2), and (4). It is assumed from this that by sweeping a current in a state where the oxygen supply is sufficient, the surface of the catalyst precursor is reduced to form a good electrochemically effective surface area, thereby improving the characteristics. Further, although the specific surface areas of (4) and (5) were almost the same, the characteristics of the catalyst in (5) were better than those in (4). It can be seen from this that for the reduction of the inside of the catalyst, the gentle process such as the diffusion rate determining process is more preferred than the abrupt process such as short-circuiting.

Example 2-2

Figure 11:
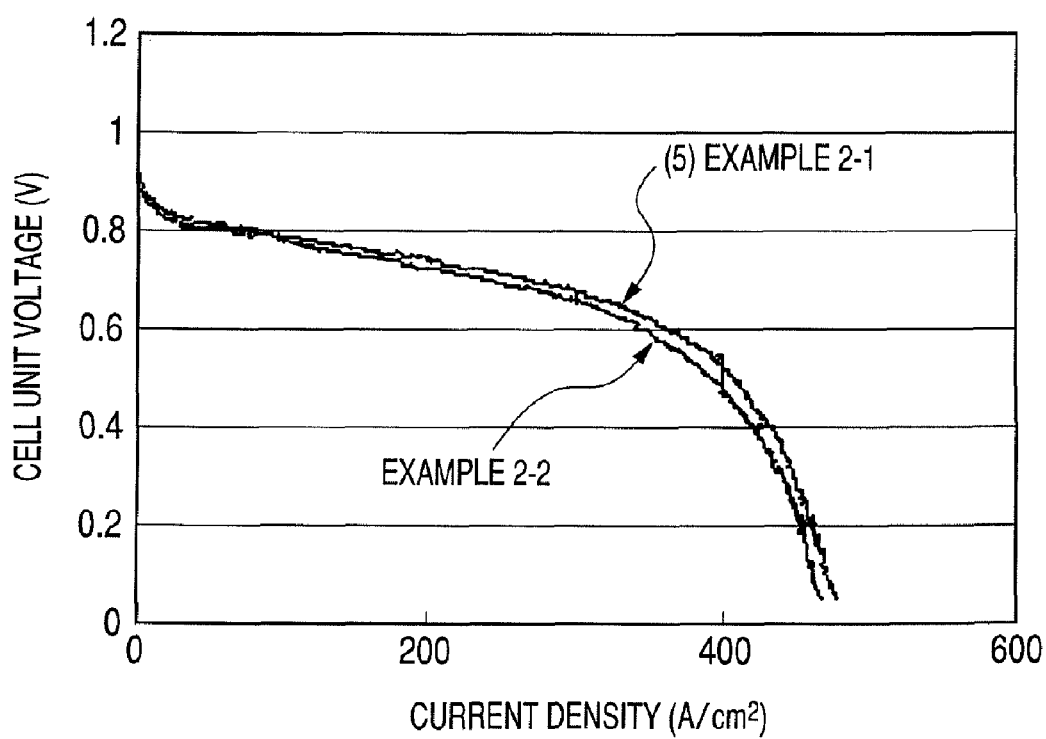
FIG. 11 is a graphical representation showing I-V curves indicating the characteristics of the catalyst layers of Example 2-1 and Example 2-2 when the sweep rate is changed.

In this Example 2-2, the sweep rate at the time of the reduction reaction was set to 100 mA/cm$^2$ which was 1,000 times that of Example 2-1 as shown in FIG. 11. It can be seen from the result that the characteristics are improved by reducing the sweep rate at the time of the reduction reaction.

It is understood from these results that the characteristics are improved by reducing the surface of the catalyst precursor while sweeping a current in a state where the oxygen supply is sufficient, and then reducing the inside of the catalyst precursor in a state where the oxygen supply is insufficient. Although the reduction of the inside in the state where the oxygen supply is insufficient may be carried out by short-circuiting both the cathode and the anode, the reduction is preferably carried out by a gentle process such as the diffusion rate determining process. Further, as the characteristics become better by reducing the rate of sweeping a current, it has been found that the sweep rate is preferably 0.1 mA/s·cm$^2$ or less.

Example 3

This example is a case where, after a dendritic structural member composed of platinum oxide was formed on the surface of a gas diffusion layer by a reactive sputtering method, a coating layer composed of a polymer electrolyte was formed on the surface of the dendritic structural member composed of platinum oxide and the dendritic structural member was reduced by hydrogen gas to produce a catalyst layer composed of a dendritic structural member formed of platinum.

(Step i)

A cathode catalyst layer was obtained by following the same procedure as in Step 1 of Example 1.

(Step ii)

The cathode catalyst layer obtained in Step i was subjected to a reduction treatment in a 2% $H_2$/He atmosphere at 0.1 MPa for 30 minutes. When the crystal phase contained in the catalyst layer was confirmed by XRD after the reduction treatment, it was confirmed that platinum oxide was reduced to platinum completely.

(Step iii)

An anode catalyst layer was obtained by following the same procedure as in Step 2 of Example 1.

The cathode catalyst layer and the anode catalyst layer prepared in Steps ii and iii were each cut into a piece with a predetermined area and placed on the both sides of a polymer electrolyte membrane (N112 (trade name); manufactured by DuPont) and the whole was hot pressed (8 MPa, 150° C., 10 minutes) to obtain a membrane electrode assembly.

A single cell unit having the configuration shown in FIG. 1 was formed by using the membrane electrode assembly manufactured by the above steps and evaluated electrochemically. Hydrogen gas was charged into the anode electrode side in a dead-ended mode, while the cathode electrode side was made open to the atmosphere, and the characteristics evaluation was conducted at a temperature of 25° C. and a humidity of 50%.

Comparative Example 2

The same procedure as in Example 3 was followed with the exception that Step ii of Example 3 was carried out before the formation of the coating layer of Step i. Thereafter, as with Example 3, a 1 wt % solution of Nafion (trade name) (a 5% solution manufactured by Wako Pure Chemical Industries, Ltd. was diluted with isopropanol to a concentration of 1%) was dropped in an amount of 16 µl per 1 $cm^2$, the solvent was evaporated in vacuum, and hot pressing was carried out to obtain a membrane electrode assembly as Comparative Example 2. When the crystal phase contained in the catalyst layer was confirmed by XRD after the reduction treatment, it could be confirmed that platinum oxide was reduced to platinum completely.

Figure 12A:
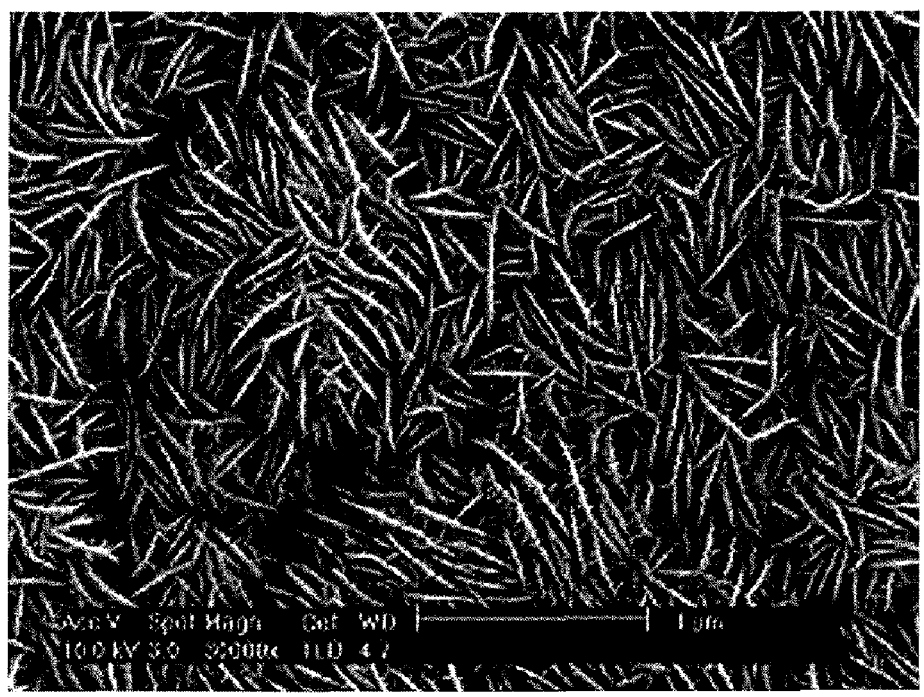
FIG. 12A is an SEM photograph of a dendritic structural member formed of platinum oxide before reduction which is formed on the surface of a gas diffusion layer in Example 3.
Figure 12B:
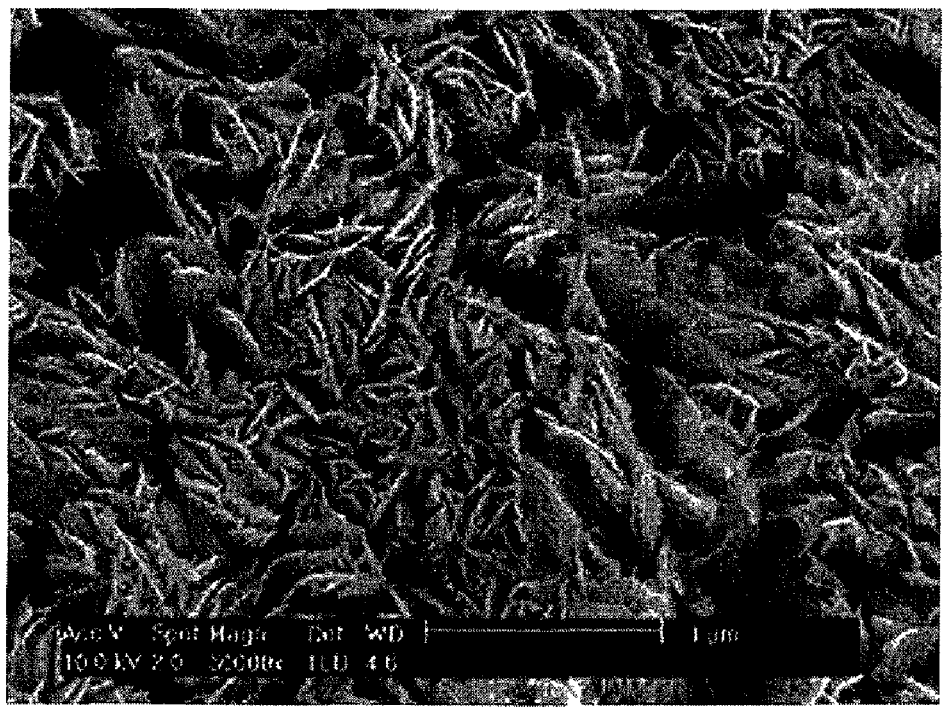
FIG. 12B is an SEM photograph of the catalyst layer of Comparative Example 2.
Figure 12C:
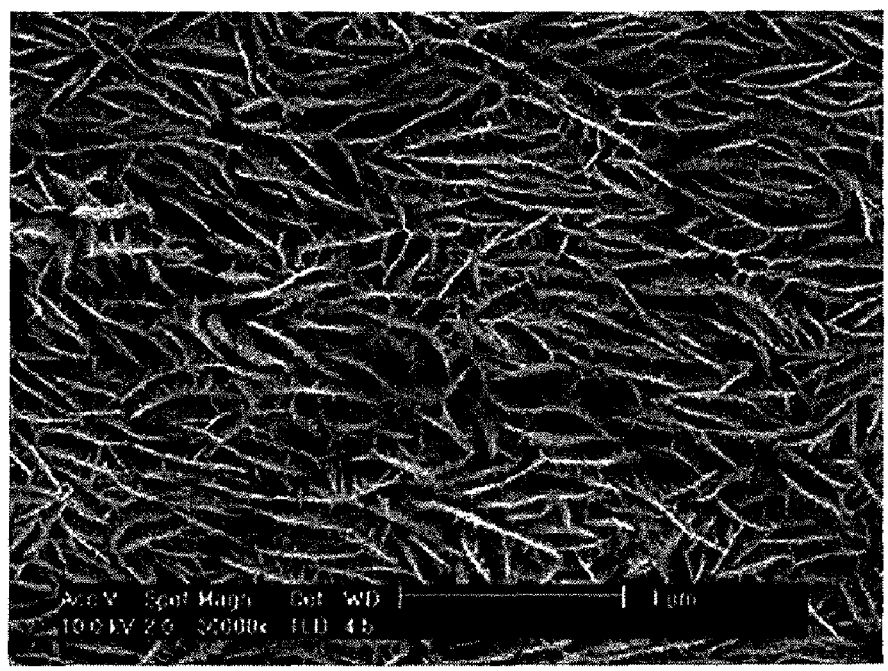
FIG. 12C is an SEM photograph of the catalyst layer of Example 3.

FIGS. 12A to 12C show the SEM observation results of the fine structures of the dendritic structural member composed of platinum oxide formed on the surface of the gas diffusion layer and the dendritic structural members composed of platinum obtained in Example 3 and Comparative Example 2.

FIG. 12A is an SEM photograph of the dendritic structural member composed of platinum oxide before the reduction formed on the surface of the gas diffusion layer in Example 3.

FIG. 12B is an SEM photograph of the catalyst layer (Comparative Example 2) obtained by forming the coating layer after the dendritic structural member composed of platinum oxide was reduced by hydrogen gas.

FIG. 12C is an SEM photograph of the catalyst layer (Example 3) reduced by hydrogen after the coating layer was formed on the dendritic structural member composed of platinum oxide.

As compared with the dendritic structural member composed of platinum oxide before the reduction, the collapse of the fine structure was observed in the catalyst layer of Comparative Example 2. In contrast to this, it can be seen that the collapse of the fine structure was suppressed in the catalyst layer of Example 3 which was reduced after the coating layer was formed.

Figure 13:
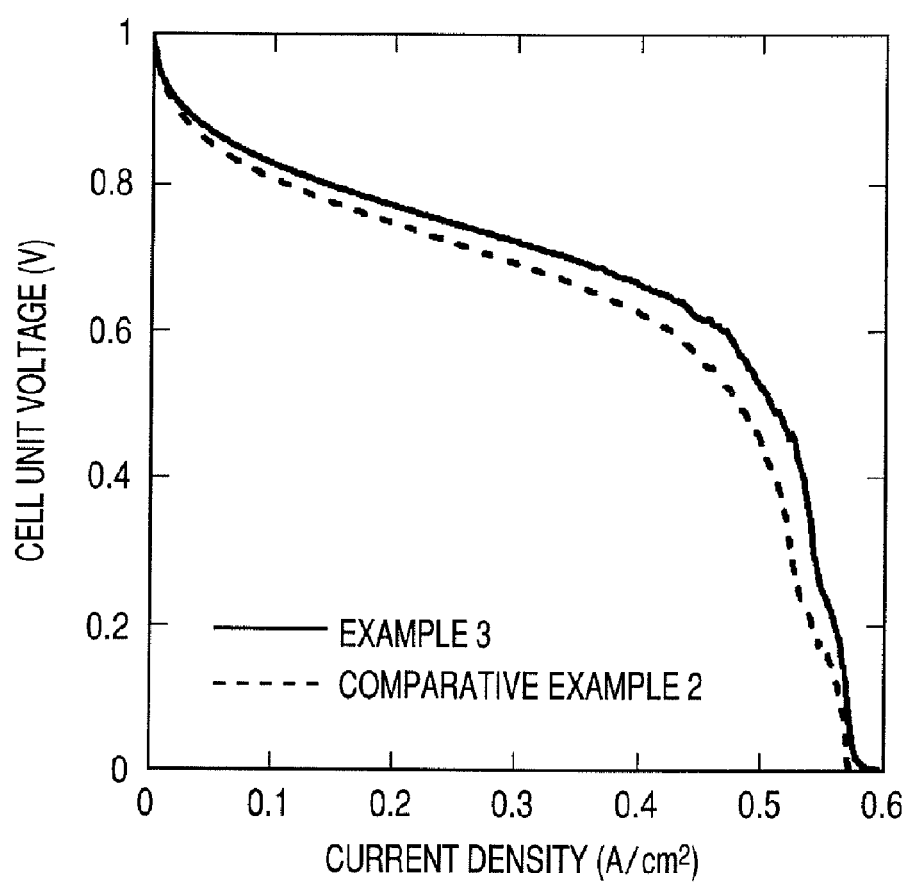
FIG. 13 is a graphical representation showing I-V curves indicating the cell characteristics of polymer electrolyte fuel cells manufactured by using the catalyst layers of Example 3 and Comparative Example 2.

FIG. 13 shows the cell characteristics (I-V characteristics) of polymer electrolyte fuel cells of Example 3 and Comparative Example 2. As compared with Comparative Example 2, it can be seen that the characteristics improved in Example 3.

The effective surface area obtained by cyclic volatammetry was 17.7 $m^2$/g in Comparative Example 2 and 19.0 $m^2$/g in Example 3 which is about 8% larger than that of Comparative Example 2. It is assumed that the characteristics were improved by an increase in electrochemically effective surface area due to the suppression of the collapse of the fine structure by the coating layer when the dendritic structural member composed of platinum oxide was reduced as shown in FIGS. 12A to 12C.

Example 4

This example is a case where, after a dendritic structural member composed of platinum oxide was formed on the surface of a PTFE sheet (Nitoflon (trade name); manufactured by Nitto Denko Corporation), a coating layer composed of a polymer electrolyte was formed on the surface of the dendritic structural member composed of platinum oxide and the dendritic structural member was reduced by hydrogen gas to produce a catalyst layer.

The dendritic structural member composed of a catalyst precursor and the catalyst layer were produced by following the same procedure as in Example 3 with the exception that the base material to be used for the reactive sputtering in Step i was changed from the gas diffusion layer to a PTFE sheet, and hot pressing was conducted, and then the PTFE sheet was removed to obtain a membrane electrode assembly.

Carbon cloth (LT-1200 W (trade name); manufactured by E-TEK Co., Ltd.) was disposed on the cathode side of the membrane electrode assembly precursor produced by the above steps and carbon cloth (LT-2500 W (trade name); manufactured by E-TEK Co., Ltd.) was disposed on the anode side to form a single cell unit having the configuration as shown in FIG. 1 and electrochemical evaluation was conducted in the same manner as in Example 3.

The confirmation of a crystal phase contained in the catalyst layer was carried out by XRD after the reduction treatment, and it was confirmed that platinum oxide was reduced to platinum completely.

Comparative Example 3

The same procedure as in Example 4 were followed with the exception that Step ii of Example 4 was carried out before the formation of the coating layer of Step i. Thereafter, a 1 wt % solution of Nafion (trade name) (a 5% solution of Wako Pure Chemical Industries, Ltd. was diluted with isopropanol to a concentration of 1%) was dropped in an amount of 16 µl per 1 $cm^2$, the solvent was vaporized in vacuum, and hot pressing was carried out to obtain a membrane electrode assembly.

The confirmation of a crystal phase contained in the catalyst layer was carried out by XRD after the reduction treatment, and it was confirmed that platinum oxide was reduced to platinum completely.

Figure 14A:
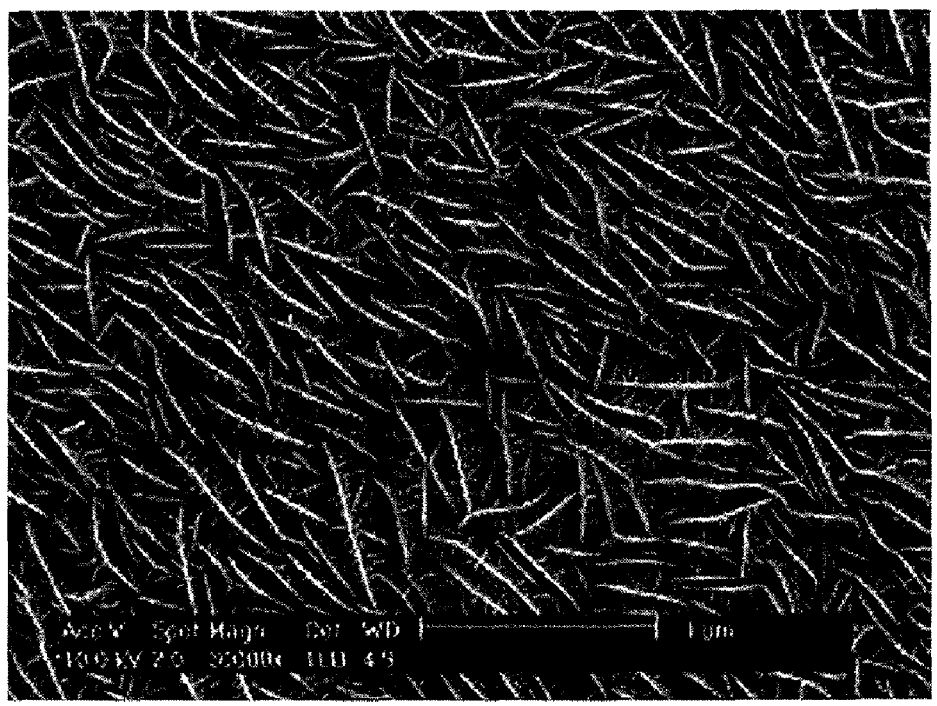
FIG. 14A is an SEM photograph of a dendritic structural member formed of platinum oxide before reduction which is formed on the surface of a PTFE sheet in Example 4.
Figure 14B:
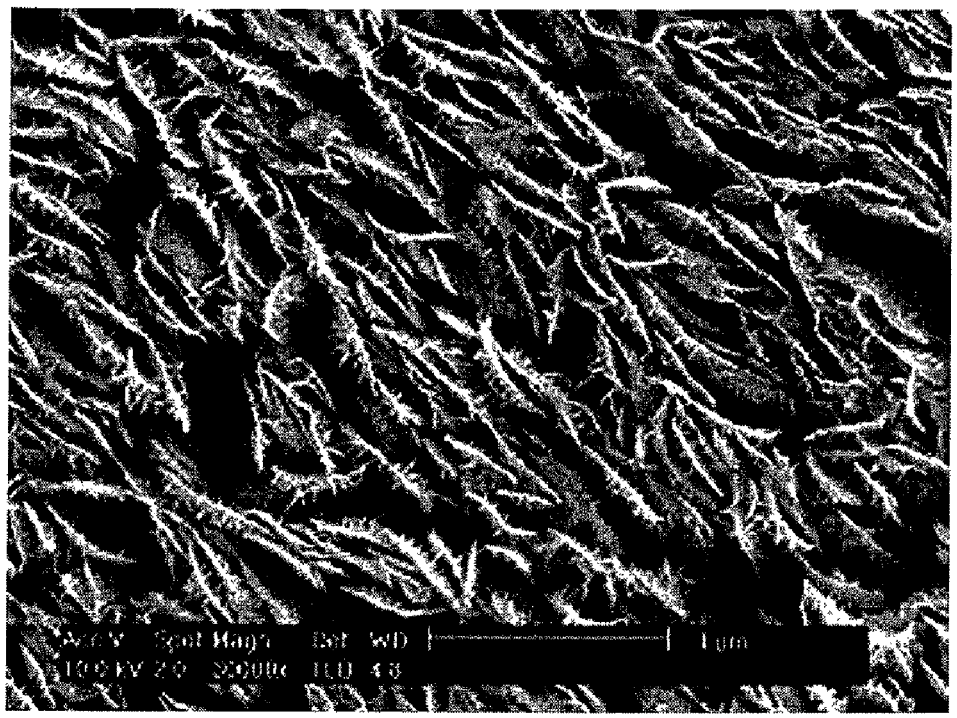
FIG. 14B is an SEM photograph of the catalyst layer of Comparative Example 3.
Figure 14C:
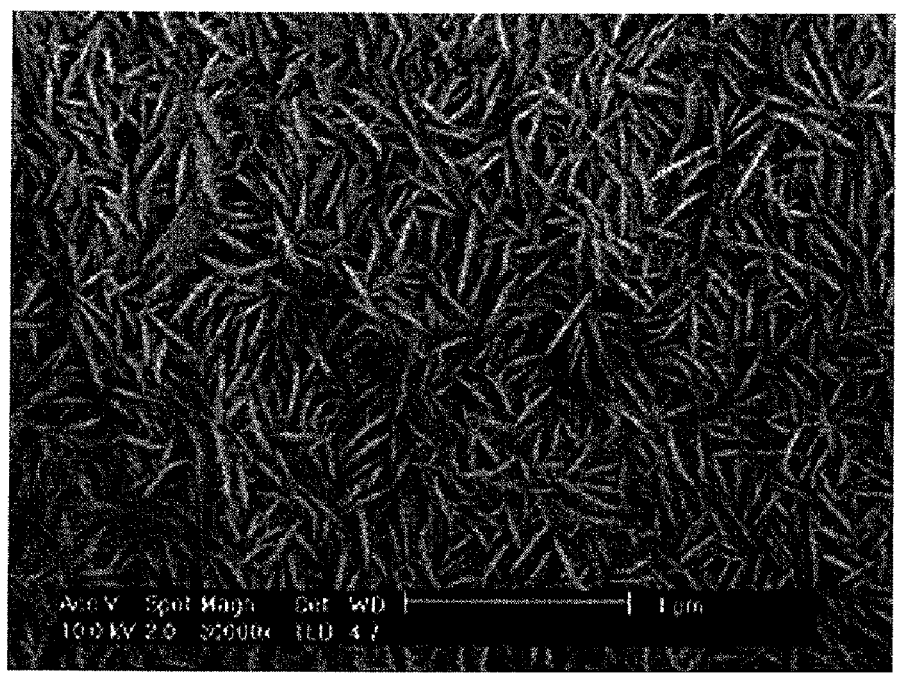
FIG. 14C is an SEM photograph of the catalyst layer of Example 4.

FIGS. 14A to 14C show the SEM observation results of the fine structure of the dendritic structural member composed of platinum oxide formed on the PTFE sheet and the fine structures of the dendritic structural members composed of platinum obtained in Example 4 and Comparative Example 3.

FIG. 14A is an SEM photograph of the dendritic structural member composed of platinum oxide before the reduction which was formed on the surface of the PTFE sheet in Example 4.

FIG. 14B is an SEM photograph of the catalyst layer (Comparative Example 3) obtained by forming the coating layer after the dendritic structural member composed of platinum oxide was reduced by hydrogen gas.

FIG. 14C is an SEM photograph of the catalyst layer obtained by reducing the dendritic structural member composed of platinum oxide of Example 4 by hydrogen gas after the coating layer was formed on the dendritic structural member.

Almost the same tendency as the results of Example 3 and Comparative Example 2 were seen from these results. That is, as compared with the dendritic structural member composed of platinum oxide before the reduction, the collapse of the fine structure was seen in the catalyst layer formed in Comparative Example 3. In contrast to this, it can be seen that the collapse of the fine structure was suppressed in the catalyst layer of Example 4 which was reduced after the formation of the coating layer.

Figure 15:
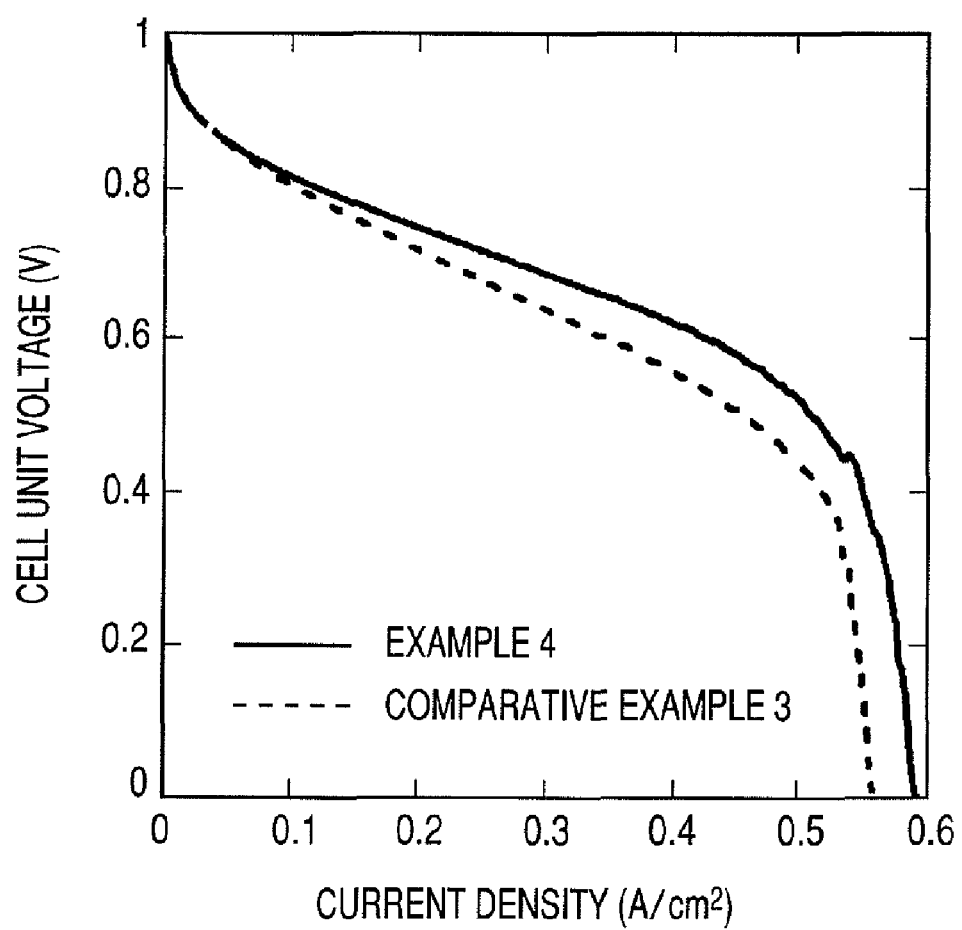
FIG. 15 is a graphical representation showing I-V curves indicating the cell characteristics of polymer electrolyte fuel cells manufactured by using the catalyst layers of Example 4 and Comparative Example 3.

FIG. 15 shows the cell characteristics (I-V characteristics) of the polymer electrolyte fuel cells of Example 4 and Comparative Example 3. As compared with Comparative Example 3, it can be seen that the characteristics improved in Example 4. The effective surface area obtained by cyclic volatammetry was 22.1 $m^2/g$ in Comparative Example 3 and 22.9 $m^2/g$ in Example 4 which is about 4% larger than that of Comparative Example 3. It is considered that the characteristics were improved by an increase in reaction specific surface area due to the suppression of the collapse of the fine structure by the coating layer when the dendritic structural member composed of platinum oxide was reduced to the dendritic structural member composed of platinum as shown in FIGS. 14A to 14C.

Example 5

This example is a case where, after a dendritic structural member composed of platinum oxide was formed on the surface of a PTFE sheet (Nitoflon (trade name; manufactured by Nitto Denko Corporation) by a reactive sputtering method, a coating layer composed of a polymer electrolyte was formed on the surface of the dendritic structural member composed of platinum oxide and the dendritic structural member was reduced with a formaldehyde solution to produce a catalyst layer.

The catalyst layer was made by following the same procedure as in Example 4 with the exception that the reduction in Step ii of Example 4 was carried out with a formaldehyde solution.

The reduction treatment was carried out as follows.

Formaldehyde (manufactured by Wako Pure Chemical Industries, Ltd.) was added to pure water to prepare a 10 vol % formaldehyde aqueous solution, and the dendritic structural member composed of platinum oxide having a coating layer provided thereon was immersed in the 10 vol % formaldehyde aqueous solution at room temperature for 60 minutes to effect a reduction treatment. When the confirmation of a crystal phase contained in the catalyst layer was carried out by XRD after the reduction treatment, it was confirmed that platinum oxide was reduced to platinum completely. After the dendritic strucutral member was fully cleaned, hot pressing was carried out in the same manner as in Example 4 to obtain a membrane electrode assembly.

Comparative Example 4

The same procedure as in Example 5 was followed with the exception that Step ii of Example 5 was carried out before the formation of the coating layer of Step i. Stated more specifically, the reduction in Step ii was carried out with a 10 vol % formaldehyde aqueous solution for 30 minutes, the dendritic structural was fully cleaned, a 1 wt % solution of Nafion (trade name) (a 5% solution of Wako Pure Chemical Industries, Ltd. was diluted with isopropanol to a concentration of 1%) was dropped in an amount of 16 μl per 1 $cm^2$, the solvent was evaporated in vacuum, and hot pressing was carried out to obtain a membrane electrode assembly.

The confirmation of a crystal phase contained in the catalyst layer was carried out by XRD after the reduction treatment, and it was confirmed that platinum oxide was reduced to platinum completely.

Figure 16A:
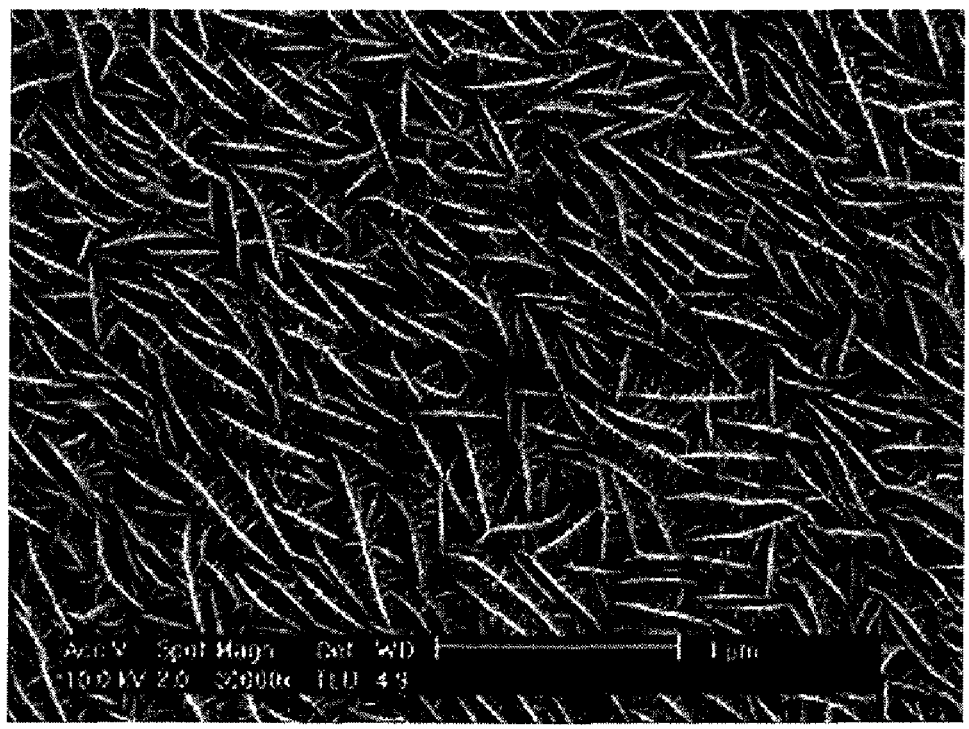
FIG. 16A is an SEM photograph of a dendritic structural member formed of platinum oxide before reduction which is formed on the surface of a PTFE sheet in Example 5.
Figure 16B:
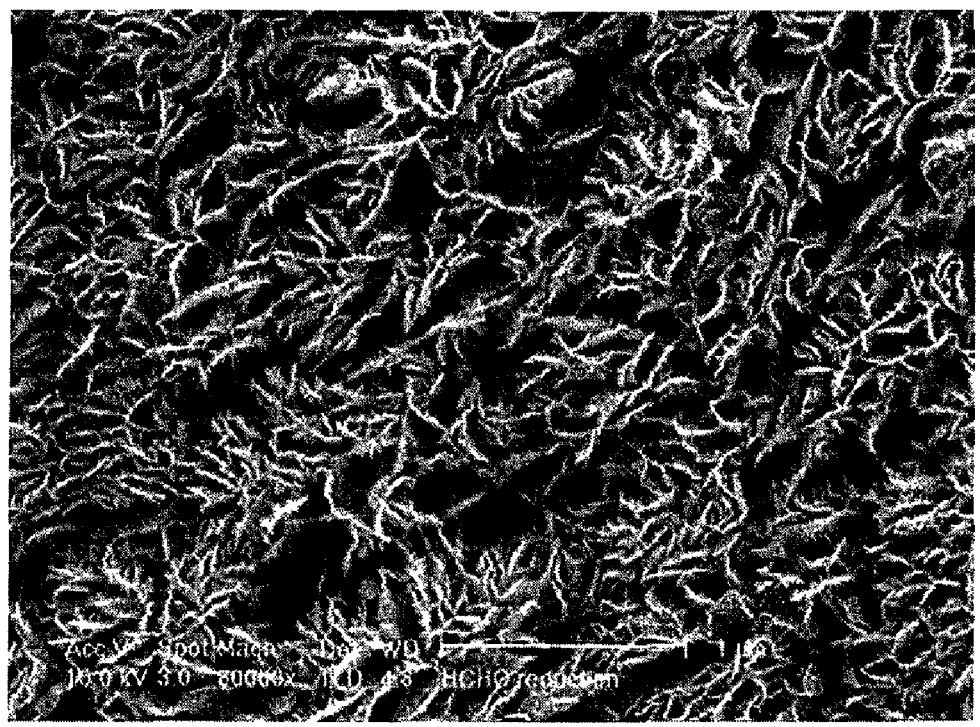
FIG. 16B is an SEM photograph of the catalyst layer of Comparative Example 4.
Figure 16C:
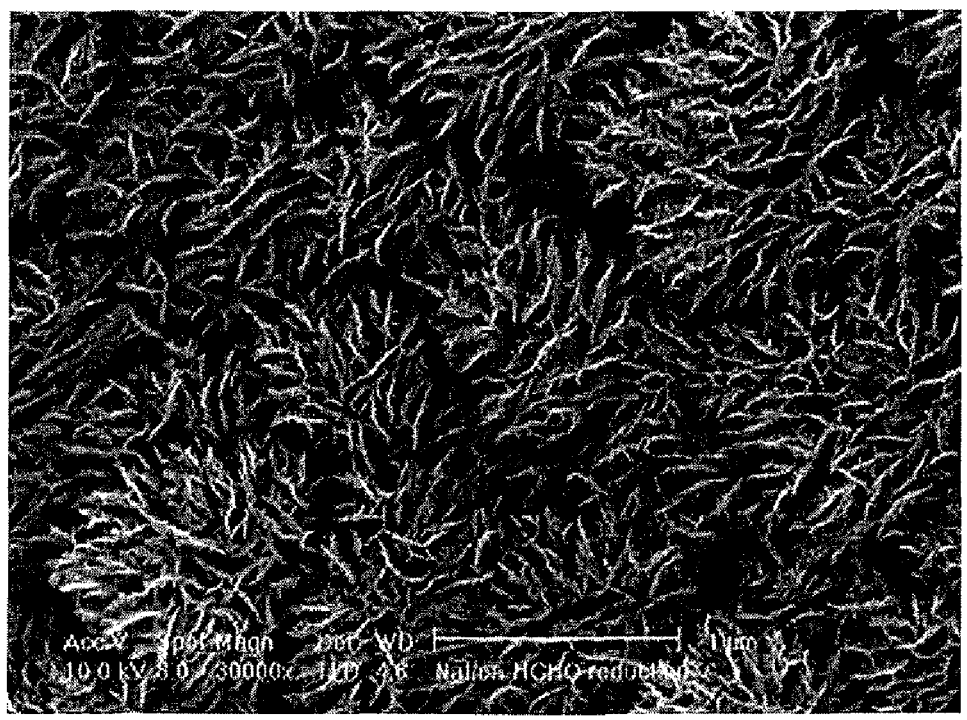
FIG. 16C is an SEM photograph of the catalyst layer of Example 5.

FIGS. 16A to 16C show the SEM observation results of the fine structure of the dendritic structural member composed of platinum oxide formed on the PTFE sheet and the fine structures of the dendritic structural members composed of platinum obtained in Example 5 and Comparative Example 4.

FIG. 16A is an SEM photograph of the dendritic structural member composed of platinum oxide before the reduction which was formed on the surface of the PTFE sheet in Example 5.

FIG. 16B is an SEM photograph of the catalyst layer (Comparative Example 4) obtained by forming the coating layer after the dendritic structural member composed of platinum oxide was reduced by the formaldehyde solution.

FIG. 16C is an SEM photograph of the catalyst layer (Example 5) obtained by reducing the dendritic structural member composed of platinum oxide by the formaldehyde solution after the coating layer was formed on the dendritic structural member.

Almost the same tendency as the results of Example 3 and Comparative Example 2 were seen from these results. That is, as compared with the dendritic structural member composed of platinum oxide before the reduction, the collapse of the fine structure was seen in the catalyst layer formed in Comparative Example 4. In contrast to this, it can be seen that the collapse of the fine structure was suppressed in the catalyst layer of Example 5 which was reduced after the coating layer was formed.

Figure 17:
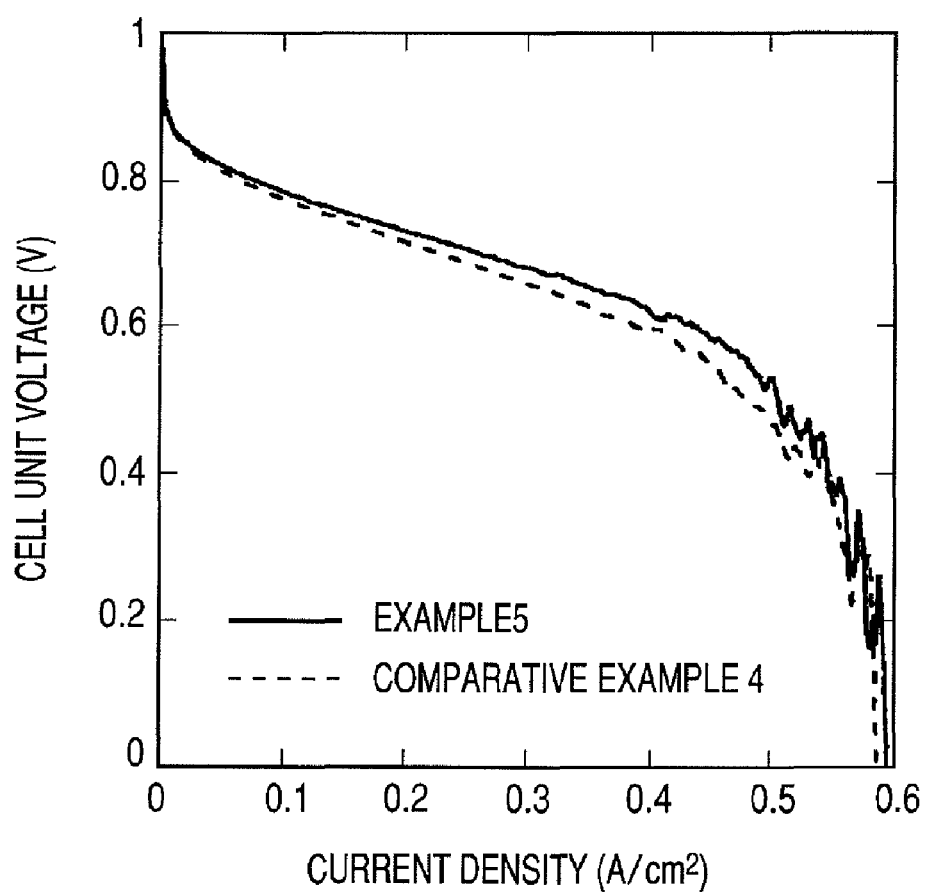
FIG. 17 is a graphical representation showing I-V curves indicating the cell characteristics of polymer electrolyte fuel cells manufactured by using the catalyst layers of Example 5 and Comparative Example 4.

FIG. 17 shows the cell characteristics (I-V characteristics) of polymer electrolyte fuel cells including the catalyst layers of Example 5 and Comparative Example 4. As compared with Comparative Example 4, it can be seen that the characteristics improved in Example 5. The effective surface area obtained by cyclic volatammetry was 17.3 $m^2/g$ in Comparative Example 4 and 19.1 $m^2/g$ in Example 5 which is about 10% larger than that of Comparative Example 4. It is considered that the characteristics were improved by an increase in electrochemically effective surface area due to the suppression of the collapse of the fine structure by the coating layer when the dendritic structural member composed of platinum oxide was reduced to the dendritic structural member composed of platinum as shown in FIG. 17.

Example 6

This example is a case where, after a dendritic structural member composed of platinum oxide was formed on the surface of a gas diffusion layer by a reactive sputtering method, a Si compound was provided to the surface of the dendritic structural member composed of platinum oxide, a coating layer composed of a polymer electrolyte was further formed on the Si compound, and electrochemical reduction was carried out using protons and electrons to produce a catalyst layer.

(Step 6-1)

A cathode catalyst layer was obtained by following the same procedure as in Step 1 of Example 1.

(Step 6-2)

Then, a catalyst layer composed of platinum black particles was formed on a PTFE sheet (Nitoflon (trade name); manufactured by Nitto Denko Corporation) as a transfer layer to a polymer electrolyte membrane by use of a doctor blade. A catalyst slurry used herein was a kneaded product of platinum black (HiSPEC 1000 (trade name); manufactured by Johnson Matthey Co.), Nafion (trade name), PTFE, IPA (isopropyl alcohol), and water. The amount of carried Pt at this time was 5.0 mg/cm$^2$.

(Step 6-3)

The dendritic structural member composed of platinum oxide and the catalyst layer composed of platinum black particles produced in Steps 6-1 and 6-2 were disposed on the both sides of a polymer electrolyte membrane (N112 (trade name); manufactured by DuPont), the whole was hot pressed, and the PETE sheet was removed to obtain a membrane electrode assembly.

(Step 6-4)

The dendritic structural member composed of platinum oxide obtained in Step 6-1 was disposed on the cathode side, the catalyst layer composed of platinum-carrying carbon obtained in Step 6-2 was disposed on the anode side, carbon cloth (LT2500-W (trade name); manufactured by E-TEK Co., Ltd.) was disposed as a gas diffusion layer on the anode side, metal foam (Celmet #5 (trade name); manufactured by Toyama Sumitomo Denko Co., Ltd.) was disposed as an oxygen supply layer on the cathode side, and current collectors for the cathode and anode were further disposed on the outer sides thereof to form a single cell unit such as shown in FIG. 1.

(Step 6-5)

In a state where hydrogen was flowed on the anode side of the single cell unit obtained by the above steps and the cathode side was made open to the atmosphere through the metal foam, a current was swept at 5 mA/s·cm$^2$ to carry out a reduction reaction of the platinum oxide provided in the cathode, thereby converting the platinum oxide into platinum.

After the membrane electrode assembly was fully dried, the characteristics of the single cell unit produced by the above steps were evaluated. The characteristics were evaluated by supplying hydrogen gas to the anode electrode side and making the cathode electrode side open to the atmosphere at a temperature of 25° C. and a humidity of 50%.

Comparative Example 5

The reduction in Step 6-5 of Example 6 was carried out in a 2% H$_2$/He atmosphere at 0.1 MPa for 30 minutes and the reduction was carried out after the formation of the hydrophobilizing agent in Step 6-1 and before the formation of the coating layer in Step 6-1 to thereby obtain a membrane electrode assembly, which was then used to produce a single cell unit.

Figure 18:
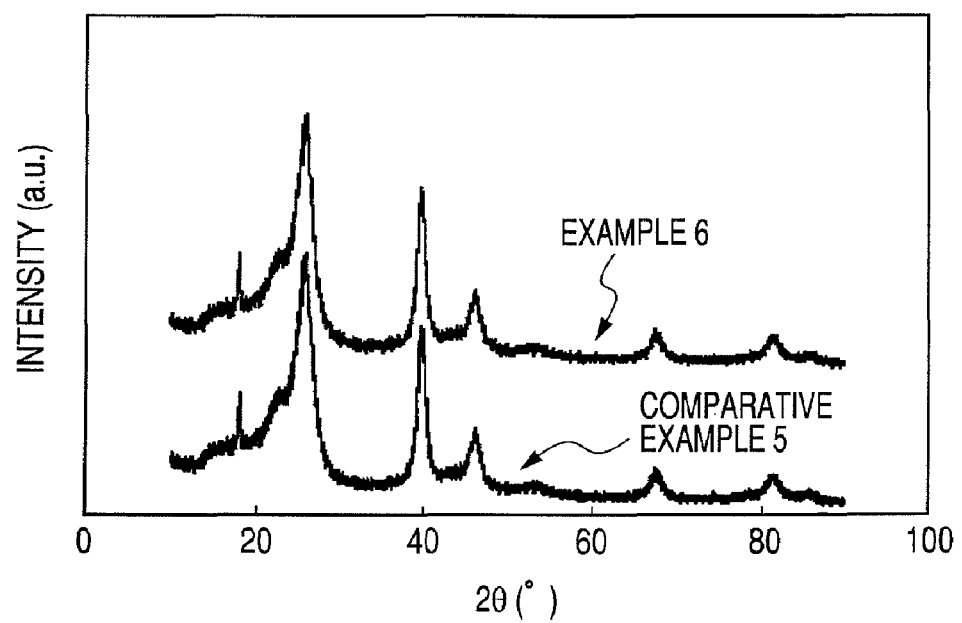
FIG. 18 is a graphical representation showing XRD patterns obtained by the structural analysis of the catalysts of Example 6 and Comparative Example 5.

FIG. 18 shows XRD patterns of the catalyst layers obtained by the methods of Example 6 and Comparative Example 5. Since the both showed platinum patterns, it can be seen that platinum oxide was reduced to platinum in the both methods. Further, it can also be seen that in both Example 6 and Comparative Example 5, the catalysts are each composed of only platinum and have the same composition.

Figure 19:
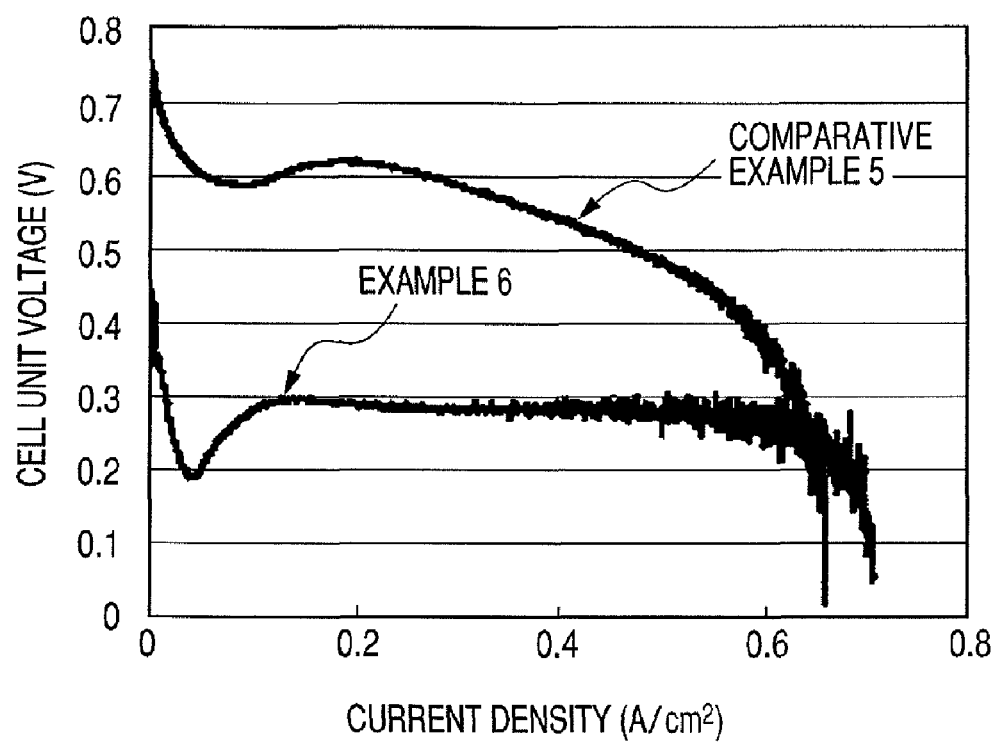
FIG. 19 is a graphical representation showing I-V curves at the time of the reduction reactions of the catalyst layers of Example 6 and Comparative Example 5.

The relationship between current and voltage at the time of the reduction reaction described in Step 6-5 of Example 6 is shown as an I-V curve in FIG. 19. For comparison, the I-V curve of Comparative Example 5 in which the same process was carried out under the same conditions is also shown therein.

In Comparative Example 5, although a rise in the cell unit voltage attributed to a reduction in the resistance of the polymer electrolyte membrane by the generated water is seen in the low current region corresponding to the initial stage after the start of power generation, the I-V curve of an ordinary fuel cell reaction is obtained. That is, the general fuel cell reaction:

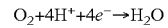

proceeded on the cathode side.

In contrast to this, in the I-V curve of Example 6, which greatly differs from that of Comparative Example 1, a plateau potential was observed at about 0.3 V. It is considered that an electrochemical reduction reaction proceeded with protons and electrons to convert platinum oxide into platinum at this potential.

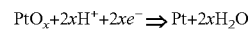

FIGS. 20 to 22 are SEM (Scanning Electron Microscope) photographs of the catalyst layers and the dendritic structural members composed of platinum oxide before the reduction of Example 6 and Comparative Example 5, which are obtained as described above.

Figure 20A:
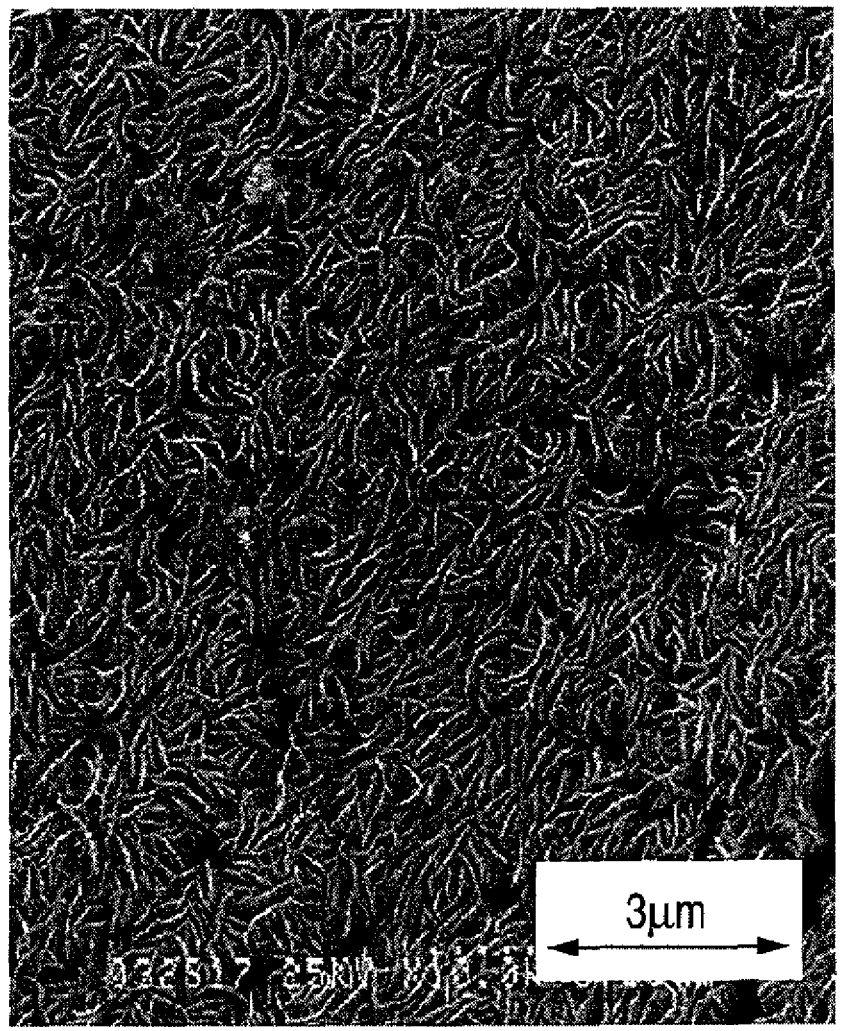
FIG. 20A is an SEM photograph of the catalyst layer of Example 6.
Figure 20B:
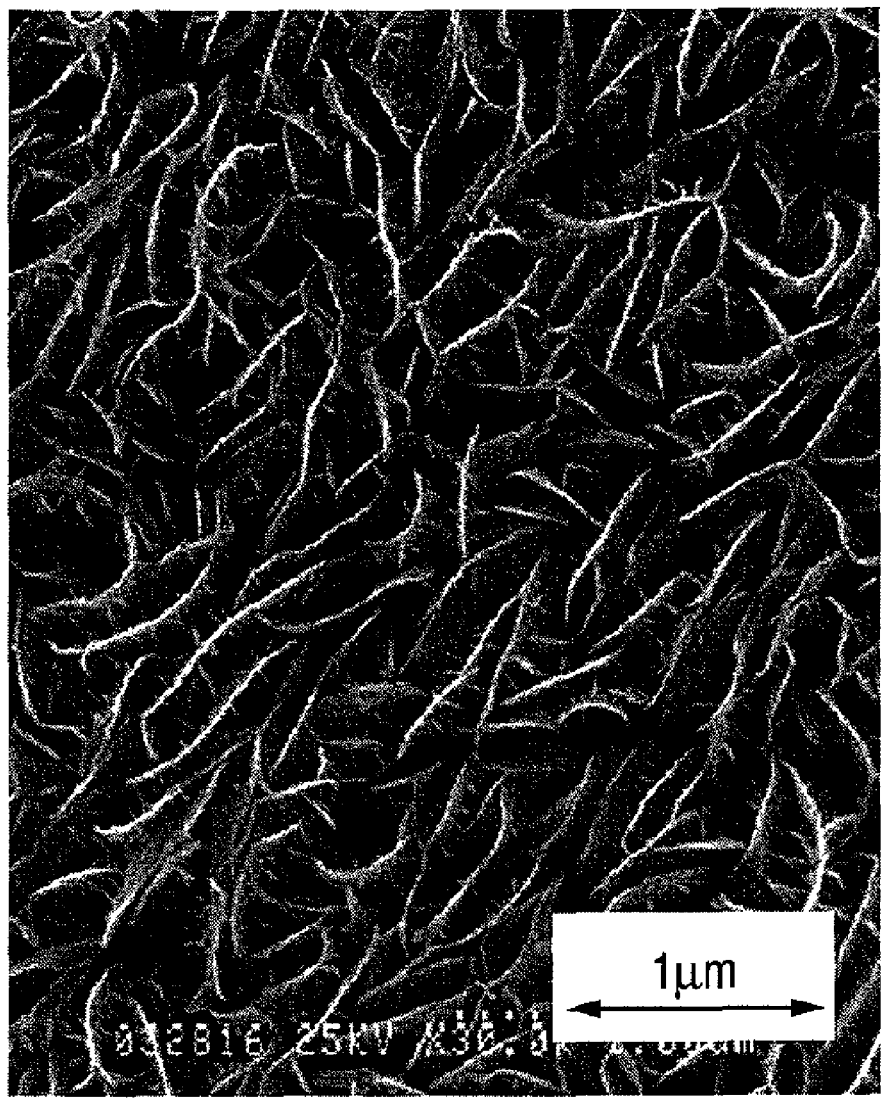
FIG. 20B is an SEM photograph of the catalyst layer of Example 6.

FIGS. 20A and 20B are SEM photographs of the catalyst layer (Example 6) obtained by electrochemically reducing the dendritic structural member composed of platinum oxide with protons and electrons after the coating layer was formed on the dendritic structural member.

Figure 21A:
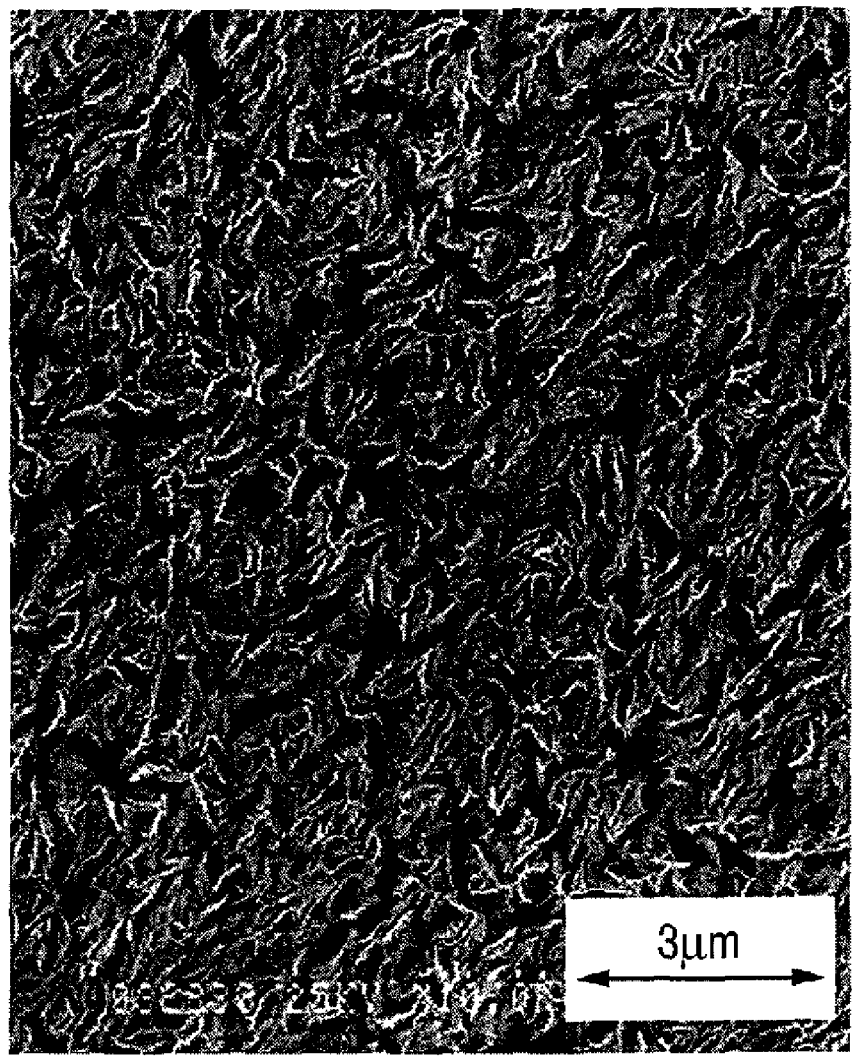
FIG. 21A is an SEM photograph of the catalyst layer of Comparative Example 5.
Figure 21B:
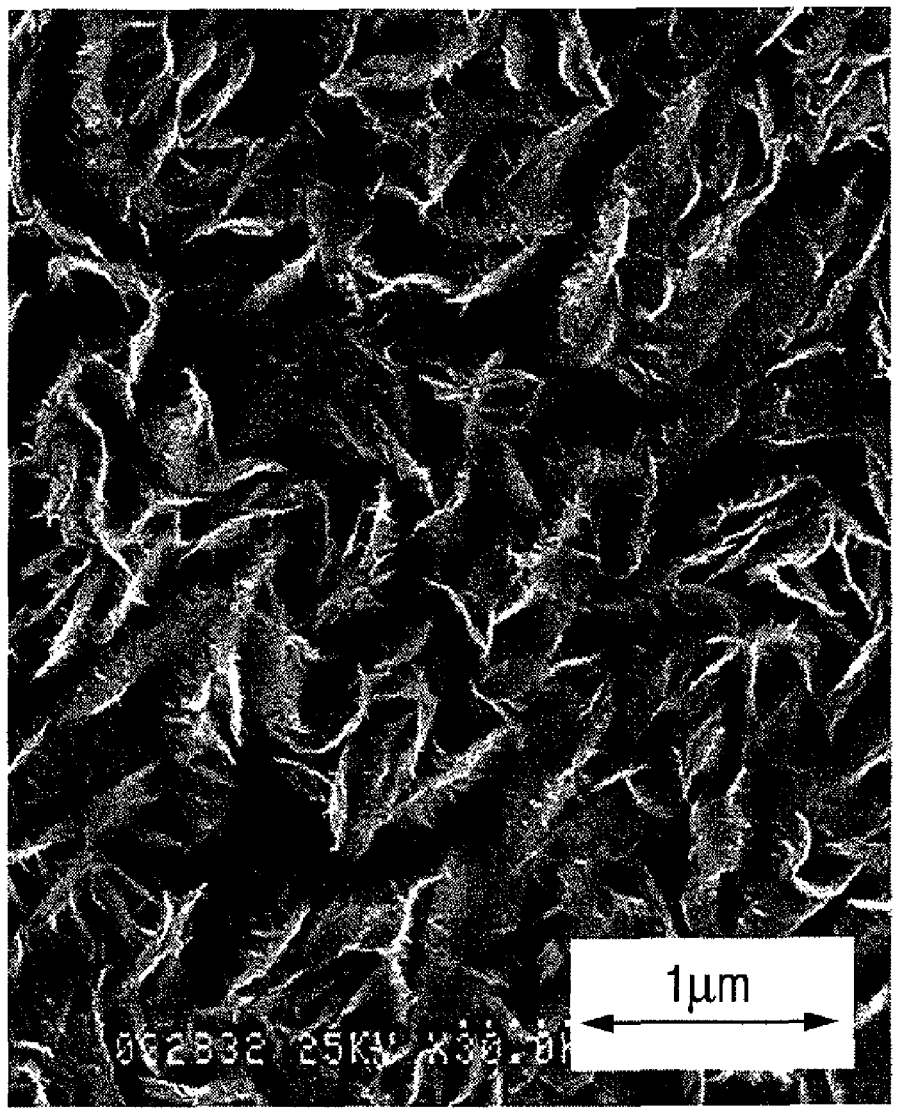
FIG. 21B is an SEM photograph of the catalyst layer of Comparative Example 5.

FIGS. 21A and 21B are SEM photographs of the catalyst layer (Comparative Example 5) obtained by reducing the dendritic structural member composed of platinum oxide with hydrogen gas and then forming a coating layer on the dendritic structural member.

Figure 22A:
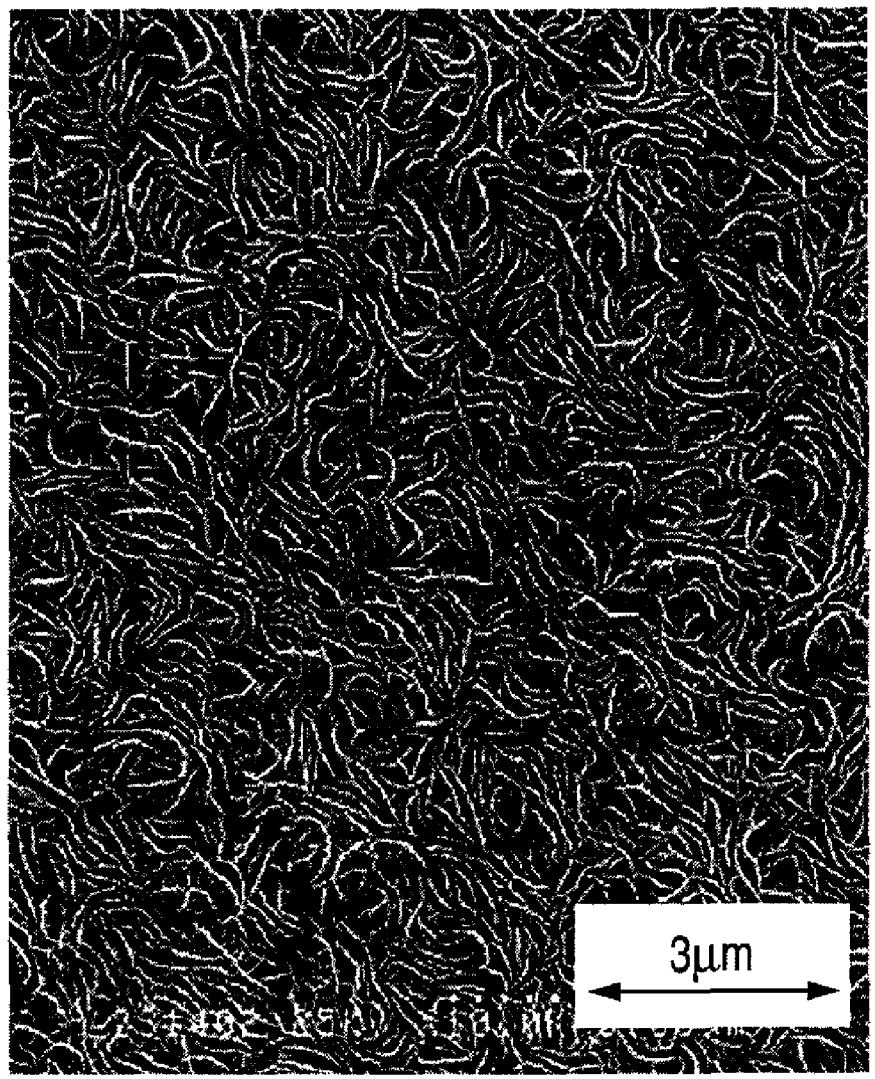
FIG. 22A is an SEM photograph of a dendritic structural member formed of platinum oxide before reduction which is formed on the surface of a gas diffusion layer in Example 6.
Figure 22B:
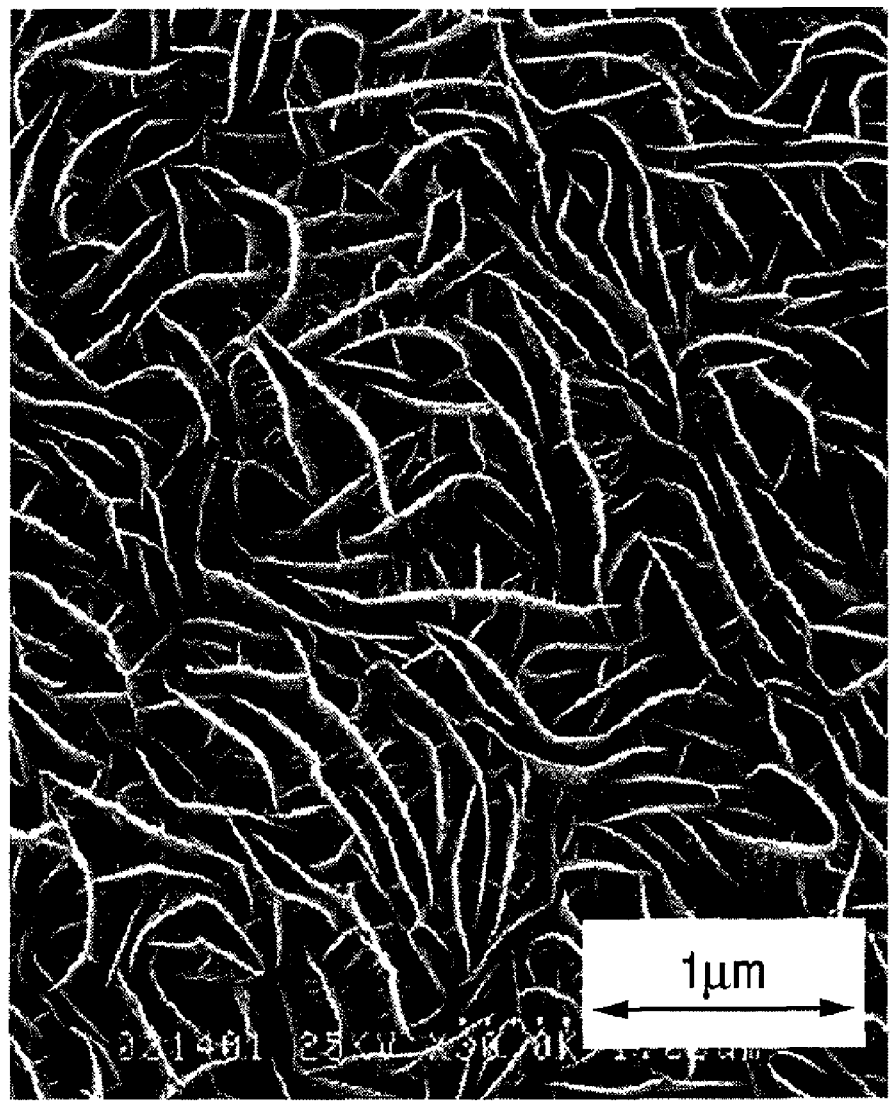
FIG. 22B is an SEM photograph of the dendritic structural member formed of platinum oxide before reduction which is formed on the surface of the gas diffusion layer in Example 6.

FIGS. 22A and 22B are SEM photographs of the dendritic structural member composed of platinum oxide before the reduction which was formed on the surface of the gas diffusion layer in Example 6.

From these photomicrographs, the collapse of the fine structure of the catalyst layer of Comparative Example 5 was observed as compared with the dendritic structural member formed of platinum oxide before the reduction. In contrast to this, it turns out that the collapse of the fine structure of the catalyst layer of Example 6, which was reduced after the formation of the coating layer was suppressed.

Figure 23:
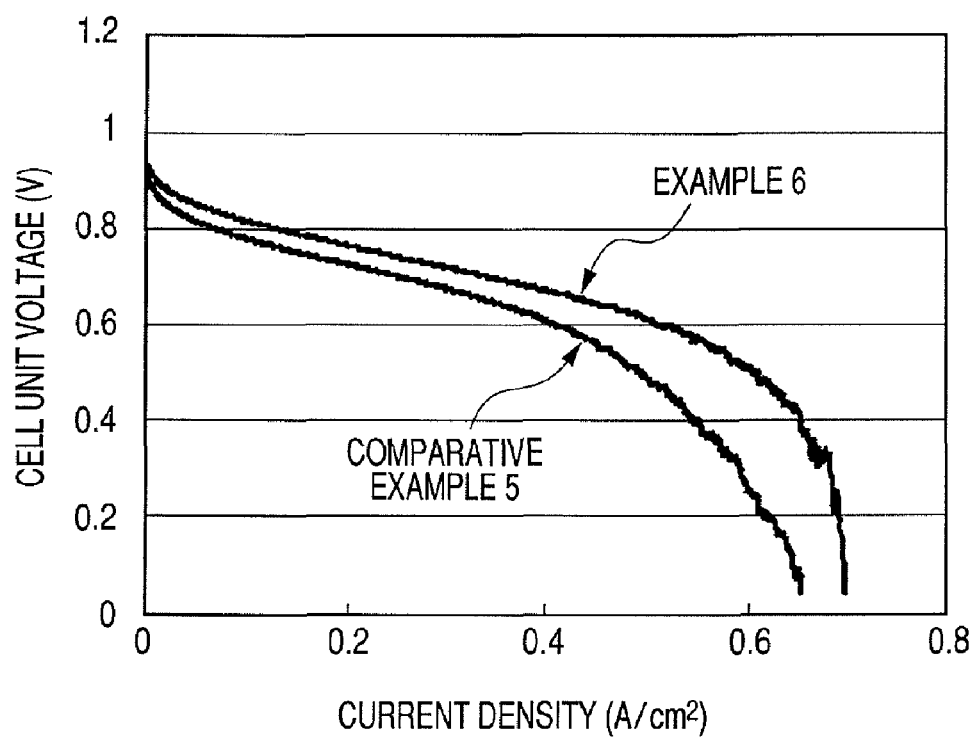
FIG. 23 is a graphical representation showing I-V curves indicating the cell characteristics of polymer electrolyte fuel cells manufactured by using the catalyst layers of Example 6 and Comparative Example 5.

FIG. 23 shows the cell characteristics (I-V characteristics) of polymer electrolyte fuel cells including these catalysts. Incidentally, each I-V curve was obtained by drawing an I-V curve several times and selecting one obtained when the water content in the electrolyte membrane became constant and the performance became stable. As shown in FIG. 23, it can be seen that in Example 6, the characteristics improved at both a low current range and a high current range and the catalytic activity improved. Further, when the effective surface area was compared with each other by means of cyclic voltammetry, it was 24.3 m$^2$/g in Comparative Example 5 and 26.6 m$^2$/g in Example 6. From these results, it is understood that a highly active catalyst layer having a large specific surface area while maintaining a fine dendritic structure can be obtained by reducing the dendritic structural member composed of platinum oxide electrochemically using protons and electrons.

Examples 7 to 11

In these examples, the sweep rate was changed as a condition for reduction shown in Step 6-5 of Example 6. Stated more specifically, the sweep rate was changed to 1 mA/cm$^2$·s and 15 mA/cm$^2$·s, and the cell voltage was set to 0 V and the current was flowed for 20 minutes. The same procedure as Steps 6-1 to 6-5 was followed with the exception that the sweep rate was set as mentioned above.

Table 1 shows the cell characteristics of the polymer electrolyte fuel cells produced by using the catalyst layers obtained in Examples 6 to 9. The cell voltage at each current density in each Example is shown in Table 1.

TABLE 1

| | Electrochemical reduction conditions | Cell unit voltage at current densities | | | | |
|---|---|---|---|---|---|---|
| | | 100 mA/cm² | 200 mA/cm² | 300 mA/cm² | 400 mA/cm² | 500 mA/cm² |
| Ex. 7 | 1 mA/cm² · s | 0.817 V | 0.766 V | 0.723 V | 0.681 V | 0.630 V |
| Ex. 6 | 5 A/cm² · s | 0.810 V | 0.759 V | 0.716 V | 0.670 V | 0.614 V |
| Ex. 8 | 15 A/cm² · s | 0.802 V | 0.753 V | 0.709 V | 0.664 V | 0.606 V |
| Ex. 9 | 0 V short 20 min | 0.800 V | 0.749 V | 0.706 V | 0.661 V | 0.606 V |

When the cell unit voltages at each current density are compared with one another, they are in the same order as the order of magnitudes of sweep rates at the time of electrochemical reduction, which shows that the sweep rate at the time of reduction has an influence upon the catalytic activity. It can be seen from this result that a highly active catalyst layer can be obtained by reducing the sweep rate at the time of reduction.

Figure 24:
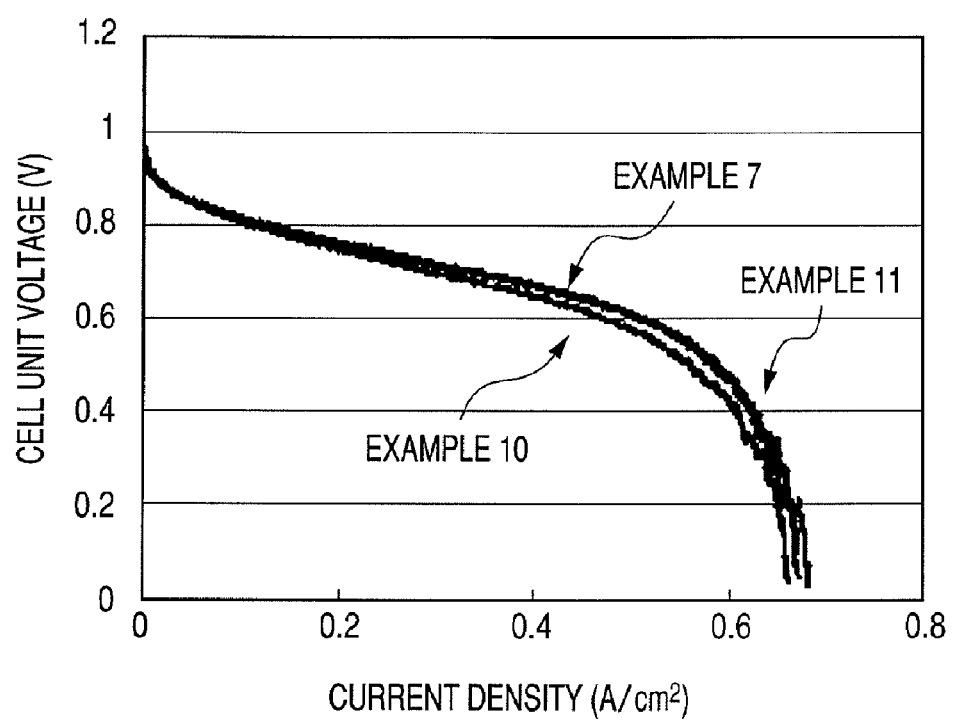
FIG. 24 is a graphical representation showing I-V curves indicating the cell characteristics of polymer electrolyte fuel cells manufactured by using the catalyst layers of Example 7, Example 10, and Example 11.

FIG. 24 shows the cell characteristics in terms of I-V curves of polymer electrolyte fuel cells each having a catalyst layer formed with the heat treatment temperature (120° C., 1 hour) in Step 6-1 being changed. Specifically, FIG. 24 shows the cell characteristics (I-V characteristics) of polymer electrolyte fuel cells, respectively, including the catalyst layer of Example 7, the catalyst layer of Example 10 prepared by following the same procedure as in Example 7 with the exception that the heat treatment temperature of Step 6-1 of Example 7 was changed to 90° C. and the catalyst layer of Example 11 prepared by following the same procedure as in Example 7 with the exception that the heat treatment temperature of Step 6-1 of Example 7 was changed to 180° C. As shown in FIG. 24, because the fuel cell units of Example 7 and Example 11 were superior to the fuel cell unit of Example 10 in performance, it was found that the heat treatment temperature in Step 6-1 was preferably 120° C. or more.

As described above, by using the catalyst layer of this example as the catalyst layer of a polymer electrolyte fuel cell, the catalytic activity and the catalyst utilization efficiency are remarkably improved, whereby a fuel cell having excellent characteristics can be obtained.

Example 12

A membrane electrode assembly was obtained by following the same procedure as in Example 4 with the exception that the provision of the Si compound in Step I was carried out after the removal of the PTFE sheet in Step III. When the confirmation of a crystal phase contained in the catalyst layer was carried out by XRD after the reduction treatment, it was confirmed that platinum oxide was reduced to platinum completely.

Carbon cloth (LT1200-W (trade name); manufactured by E-TEK Co., Ltd.) was disposed on the both sides of the thus obtained membrane electrode assembly to form a single cell unit having the configuration shown in FIG. 1 and electrochemical evaluation of the unit cell was conducted in the same manner as in Example 6.

Figure 25:
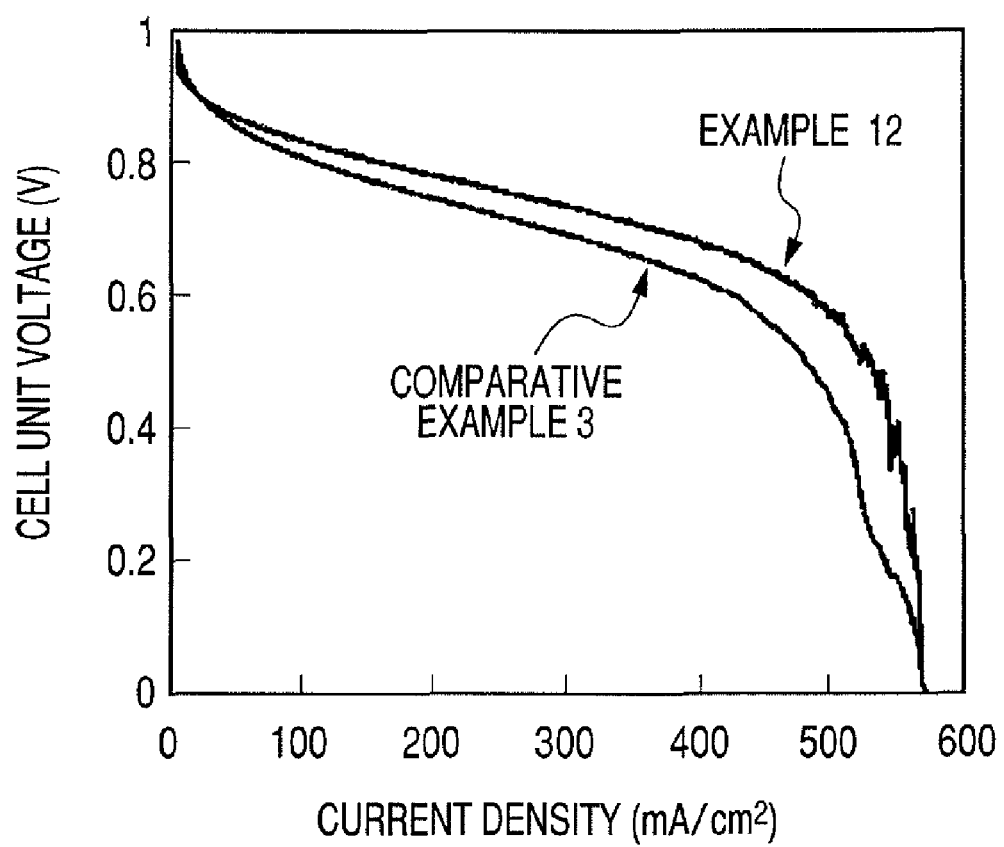
FIG. 25 is a graphical representation showing I-V curves indicating the cell characteristics of polymer electrolyte fuel cells manufactured by using the catalyst layers of Example 12 and Comparative Example 3.

FIG. 25 shows the cell characteristics (I-V characteristics) of Example 12 and Comparative Example 3. It can be seen that the characteristics of Example 12 were improved compared to those of Comparative Example 3. The effective surface area obtained by cyclic voltammetry was 17.7 m²/g in Comparative Example 7 and 18.2 m²/g in Example 12, which was about 2.8% larger than that of Comparative Example 7. It is assumed that this is because the characteristics were improved by an increase in reaction specific surface area due to the suppression of the collapse of the fine structure by the coating layer when the dendritic structural member composed of platinum oxide was reduced to a dendritic structural member composed of platinum.

Further, when the Si/Pt molar ratio was measured by XRF (fluorescent X-ray analysis) to obtain the amount of methylsiloxane as a hydrophobilizing agent contained in the catalyst layer on the cathode side, it was 0.67 in Example 12 and 0.18 in Comparative Example 3. That is, the MEA of Example 12 contained a larger amount of a highly active hydrophobilizing agent than the MEA of Comparative Example 3.

Although Example 12 contained a larger amount of the hydrophobilizing agent, the effective surface area of Example 12 was almost the same as that of Example 7.

Example 13

This example is a case where, after a dendritic structural member composed of platinum oxide was formed on the surface of a gas diffusion layer by a reactive sputtering method, a coating layer composed of a hydrocarbon-based polymer electrolyte represented by the chemical formula (1) below was formed on the surface of the dendritic structural member composed of platinum oxide, and the dendritic structural member was reduced by hydrogen gas to form a catalyst layer formed of a dendritic structural member composed of platinum.

The dendritic structural member composed of platinum oxide and the catalyst layer were prepared by following the same procedure as in Example 3 with the exception that the coating layer was changed from the fluorine-based polymer electrolyte to the hydrocarbon-based polymer electrolyte represented by the chemical formula (1) below, and hot pressing was carried out to obtain a membrane electrode assembly.

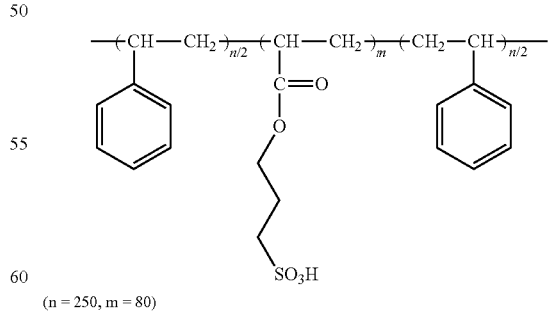

(n = 250, m = 80)

(n=250, m=80)

Carbon cloth (LT1200-W (trade name); manufactured by E-TEK Co., Ltd.) was disposed on the both sides of the membrane electrode assembly precursor produced by the above steps to form a single cell unit having the configuration as shown in FIG. 1 and electrochemical evaluation of the unit cell was conducted in the same manner as in Example 3.

When the confirmation of a crystal phase contained in the catalyst layer was carried out by XRD after the reduction treatment, it was confirmed that platinum oxide was reduced to platinum completely.

Comparative Example 6

A membrane electrode assembly was obtained by following the same procedure as in Comparative Example 2 with the exception that a 1 wt % solution (mixed solution of THF and methanol) of a hydrocarbon-based polymer electrolyte represented by the chemical formula (1) as in Example 13 was dropped on the dendritic structural member composed of platinum oxide in an amount of 16 μl per 1 $cm^2$ instead of dropping a 1 wt % solution of Nafion (trade name) (a 5% solution manufactured by Wako Pure Chemical Industries, Ltd. Was diluted with isopropanol to a concentration of 1%) which is a proton conductive electrolyte in an amount of 16 μl per 1 $cm^2$ in Comparative Example 2.

When the confirmation of a crystal phase contained in the catalyst layer was carried out by XRD after the reduction treatment, it was confirmed that platinum oxide was reduced to platinum completely.

Figure 26A:
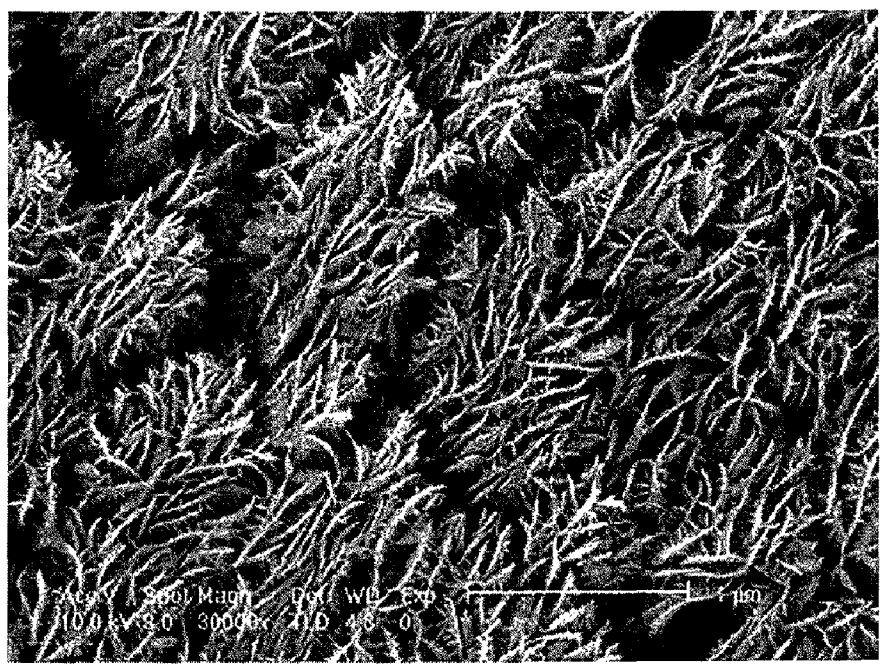
FIG. 26A is an SEM photograph of the catalyst layer of Example 13.
Figure 26B:
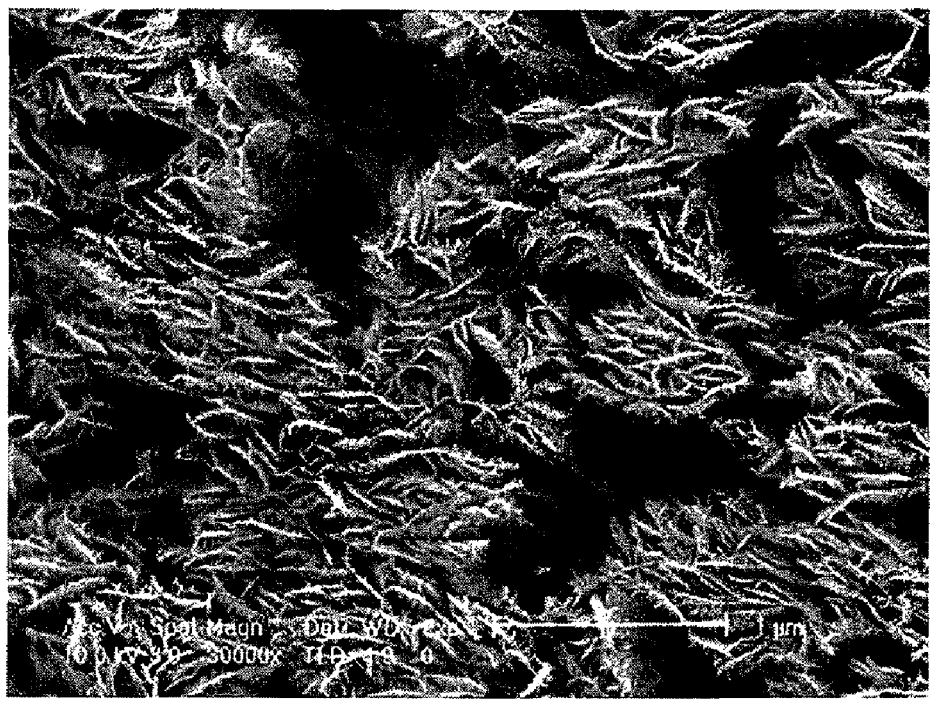
FIG. 26B is an SEM photograph of the catalyst layer of Comparative Example 6.

FIGS. 26A and 26B show the SEM observation results of the fine structures of the dendritic structural members composed of platinum obtained in Example 13 and Comparative Example 6.

FIG. 26A is an SEM photograph of the catalyst layer (Example 13) obtained by reducing the dendritic structural member composed of platinum oxide by hydrogen gas after the coating layer composed of the hydrocarbon-based polymer electrolyte represented by the chemical formula (1) was formed on the dendritic structural member.

FIG. 26B is an SEM photograph of the catalyst layer (Comparative Example 6) obtained by forming the coating layer composed of the hydrocarbon-based polymer electrolyte represented by the chemical formula (1) after the dendritic structural member composed of platinum oxide was reduced by hydrogen gas.

Almost the same tendency as in Example 3 and Comparative Example 2 was seen from these results. That is, a change in the fine structure of the catalyst layer formed in Comparative Example 6 was seen as compared with the dendritic structural member composed of platinum oxide before the reduction. In contrast to this, it is understood that a change in the fine structure of the catalyst layer of Example 13 which was reduced after the coating layer was formed was suppressed.

Figure 27:
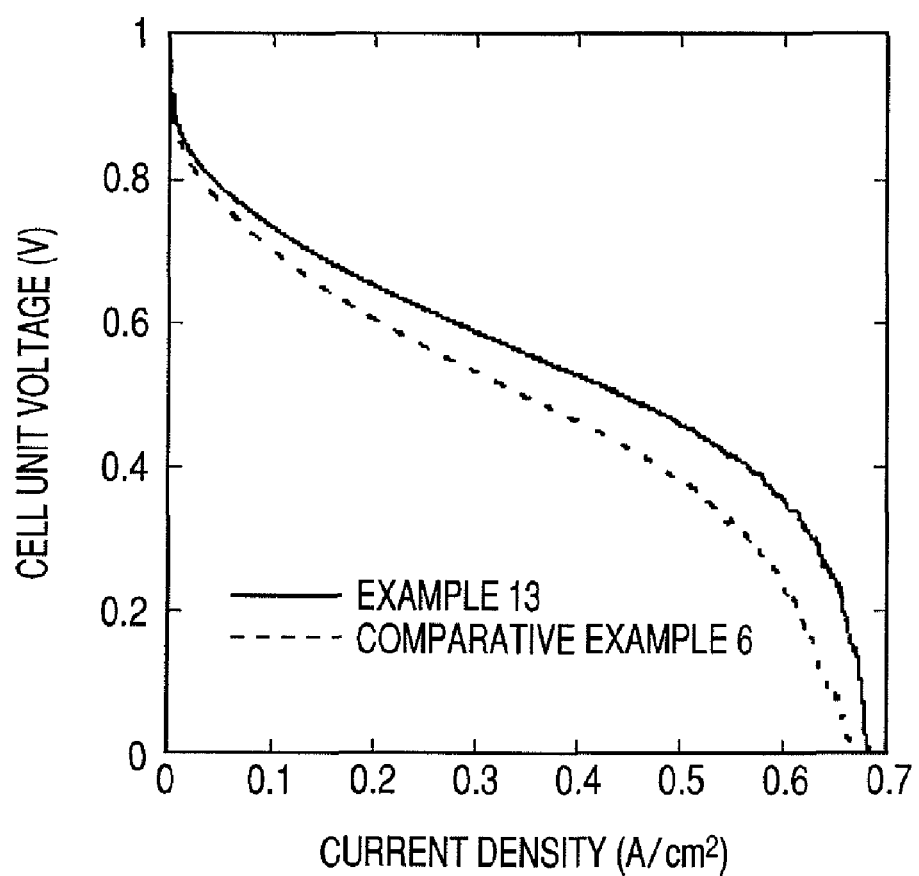
FIG. 27 is a graphical representation showing I-V curves indicating the cell characteristics of polymer electrolyte fuel cells manufactured by using the catalyst layers of Example 13 and Comparative Example 6.

FIG. 27 shows the cell characteristics (I-V characteristics) of Example 13 and Comparative Example 6. It turns out that the characteristics of Example 13 are improved as compared to those of Comparative Example 6. As with the coating layer (Example 3) composed of a fluorine-based polymer electrolyte, even when the coating layer composed of a hydrocarbon-based polymer electrolyte was used, the improvement of performance was observed by carrying out the reduction treatment of the dendritic structural member composed of platinum oxide after the formation of the coating layer.

According to the present invention, by providing a coating layer on a surface of a dendritic structural member prepared by a vapor deposition method, and then electrochemically reducing the dendritic structural member composed of the catalyst precursor with protons and electrons or through contact with a gas containing a reducing gas or a solution containing a reducing agent, the catalyst precursor can be reduced to a catalyst without collapsing the dendritic structure. Thereby, a highly active fuel cell catalyst having a large specific surface area can be realized.

The present invention enables the production of a thin film catalyst layer having a large specific surface area and high activity. A polymer electrolyte fuel cell having the catalyst layer can be used as a fuel cell for small electric equipments such as mobile phones, notebook personal computers, digital cameras and the like.

The present invention is not limited to the above embodiments and various changes and modifications can be made within the spirit and scope of the present invention. Therefore to apprise the public of the scope of the present invention, the following claims are made.

This application claims the benefit of Japanese Patent Applications Nos. 2007-155473, filed Jun. 12, 2007, and No. 2008-070442, filed Mar. 18, 2008, which are hereby incorporated by reference herein in their entirety.

The invention claimed is:

1. A method of producing a fuel cell catalyst layer, comprising the steps of:
    forming a dendritic structural member comprising a catalyst precursor by a vapor phase method;
    providing a proton conducting electrolyte layer on a surface of the dendritic structural member; and
    subjecting the dendritic structural member having the proton conducting electrolyte layer provided thereon to a reduction treatment.

2. The method of producing a fuel cell catalyst layer according to claim 1, wherein the dendritic structural member comprising the catalyst precursor is a dendritic structural member containing platinum oxide or a dendritic structural member containing a composite oxide of platinum oxide and an element except platinum.

3. The method of producing a fuel cell catalyst layer according to claim 1, wherein the vapor phase method is a sputtering method.

4. The method of producing a fuel cell catalyst layer according to claim 1, wherein a proton conducting electrolyte in the proton conducting electrolyte layer comprises a perfluorosulfonic acid polymer.

5. The method of producing a fuel cell catalyst layer according to claim 1, wherein a proton conducting electrolyte in the proton conducting electrolyte layer comprises a hydrocarbon-based polymer electrolyte.

6. The method of producing a fuel cell catalyst layer according to claim 1, wherein the step of subjecting the dendritic structural member having the coating layer provided thereon to the reduction treatment comprises a step of electrochemically reducing the dendritic structural member with protons and electrons.

7. The method of producing a fuel cell catalyst layer according to claim 6, wherein the step of electrochemically reducing the dendritic structural member with protons and electrons comprises a two-stage reduction process.

8. The method of producing a fuel cell catalyst layer according to claim 7, wherein the two-stage reduction process comprises a first stage of reducing a surface of the catalyst precursor and a second stage of reducing an inside of the catalyst precursor.

9. The method of producing a fuel cell catalyst layer according to claim 1, wherein the step of subjecting the dendritic structural member having the proton conducting electrolyte layer provided thereon to the reduction treatment comprises a step of bringing a gas containing a reducing agent into contact with the dendritic structural member to effect reduction.

10. The method of producing a fuel cell catalyst layer according to claim 1, wherein the step of subjecting the dendritic structural member having the proton conducting electrolyte layer provided thereon to the reduction treatment comprises a step of bringing a solution containing a reducing agent into contact with the dendritic structural member to effect reduction.

11. The method of producing a fuel cell catalyst layer according to claim 1, wherein a thickness of the proton conducting electrolyte layer is 1 nm or more and 200 nm or less.

12. A method of producing a fuel cell catalyst layer, comprising the steps of:
    forming a dendritic structural member comprising a catalyst precursor by a vapor phase method;
    providing a proton conducting electrolyte layer comprising an electrolyte with proton conductivity on a surface of the dendritic structural member;
    applying the dendritic structural member having the proton conducting electrolyte layer provided thereon to at least one surface of a polymer electrolyte membrane to form a membrane electrode assembly precursor;
    incorporating the membrane electrode assembly precursor into a fuel cell unit; and
    energizing the fuel cell unit.

13. The method of producing a fuel cell catalyst layer according to claim 12, wherein the energizing is performed in two stages.

14. The method of producing a fuel cell catalyst layer according to claim 12, wherein the energizing is performed by supplying hydrogen to an anode electrode of the fuel cell unit and sweeping a current.

15. The method of producing a fuel cell catalyst layer according to claim 1, further comprising, between the step of forming the dendritic structural member comprising the catalyst precursor by the vapor phase method and the step of providing the proton conducting electrolyte layer on the surface of the dendritic structural member, a step of providing to the surface of the dendritic structural member an Si compound comprising Si, —OH bonded to the Si or a group, which is bonded to the Si and becomes —OH through hydrolysis, and a hydrophobic group.

16. The method of producing a fuel cell catalyst layer according to claim 1, further comprising, between the step of providing the proton conducting electrolyte layer on the surface of the dendritic structural member and the step of subjecting the dendritic structural member having the coating layer provided thereon to the reduction treatment, a step of providing to the surface of the dendritic structural member a Si compound comprising Si, —OH bonded to the Si or a group, which is bonded to the Si and becomes —OH through hydrolysis, and a hydrophobic group.

17. The method of producing a fuel cell catalyst layer according to claim 15, wherein the group, which becomes —OH through hydrolysis, is any one of —H, —OR, and —Cl, where R is an alkyl group having 6 or less carbon atoms.

18. The method of producing a fuel cell catalyst layer according to claim 16, wherein the group, which becomes —OH through hydrolysis, is any one of —H, —OR, and —Cl, where R is an alkyl group having 6 or less carbon atoms.

19. The method of producing a fuel cell catalyst layer according to claim 12, further comprising, between the step of forming the dendritic structural member comprising the catalyst precursor by the vapor phase method and the step of providing the proton conducting electrolyte layer on the surface of the dendritic structural member, a step of providing to the surface of the dendritic structural member an Si compound comprising Si, —OH bonded to the Si or a group, which is bonded to the Si and becomes —OH through hydrolysis, and a hydrophobic group.

20. The method of producing a fuel cell catalyst layer according to claim 19, wherein the group, which becomes —OH through hydrolysis, is any one of —H, —OR, and —Cl, where R is an alkyl group having 6 or less carbon atoms.

* * * * *